United States Patent [19]

Kamel et al.

[11] Patent Number: 5,258,132
[45] Date of Patent: *Nov. 2, 1993

[54] WAX-ENCAPSULATED PARTICLES

[75] Inventors: Ahmed A. Kamel, Valley Cottage; David J. Lang, Ossining; Paul A. Hanna, Queens Village, all of N.Y.; Robert Gabriel, Cranbury, N.J.; Richard Theiler, Harrington Park, N.J.; Alyse S. Goldman, Hoboken, N.J.

[73] Assignee: Lever Brothers Company, Division of Conopco, Inc., New York, N.Y.

[*] Notice: The portion of the term of this patent subsequent to Apr. 6, 2010 has been disclaimed.

[21] Appl. No.: 847,141

[22] Filed: Mar. 31, 1992

Related U.S. Application Data

[63] Continuation-in-part of Ser. No. 688,691, Apr. 24, 1991, Pat. No. 5,230,822, which is a continuation-in-part of Ser. No. 563,732, Aug. 3, 1990, abandoned, which is a continuation-in-part of Ser. No. 436,996, Nov. 15, 1989, abandoned.

[51] Int. Cl.$^5$ ............................................. C11D 3/395
[52] U.S. Cl. ........................................ 252/94; 252/99; 252/174.12; 252/174.13; 428/402.24; 428/403
[58] Field of Search ................ 252/95, 99, 174.12, 252/174.13, 186.25, 186.27, 186.3, 186.31; 423/268; 428/402.24, 403

[56] References Cited

U.S. PATENT DOCUMENTS

| | | | |
|---|---|---|---|
| 3,108,078 | 10/1963 | Wixon | 252/95 |
| 3,253,944 | 5/1966 | Wurster | 117/100 |
| 3,332,882 | 7/1967 | Blumbergs | 252/186 |
| 3,703,470 | 11/1972 | Brennan | 252/99 |
| 3,709,708 | 1/1973 | Straadlus | 106/216 |
| 3,847,830 | 11/1974 | Williams | 252/106 |
| 3,856,699 | 12/1974 | Miyano et al. | 252/316 |
| 3,908,045 | 9/1975 | Alterman et al. | 427/213 |
| 3,943,063 | 3/1976 | Morishita et al. | 252/316 |
| 3,954,944 | 5/1976 | Aldcroft et al. | 423/335 |
| 3,983,254 | 9/1976 | Alterman et al. | 428/403 |
| 4,009,113 | 2/1977 | Green et al. | 252/95 |
| 4,078,099 | 3/1978 | Mazzola | 427/213 |
| 4,087,369 | 5/1978 | Wevers | 252/102 |

(List continued on next page.)

FOREIGN PATENT DOCUMENTS

| | | |
|---|---|---|
| 106634 | 4/1984 | European Pat. Off. . |
| 132184 | 1/1985 | European Pat. Off. . |
| 062523 | 12/1987 | European Pat. Off. . |
| 298222 | 1/1989 | European Pat. Off. . |
| 307587 | 3/1989 | European Pat. Off. . |
| 1476920 | 3/1967 | France . |
| 911410 | 11/1962 | United Kingdom . |
| 1242247 | 8/1971 | United Kingdom . |
| 1381121 | 1/1975 | United Kingdom . |
| 2186884 | 8/1987 | United Kingdom . |

OTHER PUBLICATIONS

"Factors to Consider in Fluid-Bed Processing" by David M. Jones, reprinted from Pharmaceutical Technology, Apr. 1985.

"Petroleum Waxes" by G. E. Unmuth from Wax Technology.

(List continued on next page.)

Primary Examiner—Gary P. Straub
Assistant Examiner—Timothy C. Vanoy
Attorney, Agent, or Firm—A. Kate Huffman

[57] ABSTRACT

Solid core particles encapsulated in a single coat of paraffin wax, the wax having a melting point of about 40° to about 50° C. and a solids content of from 100 to about 35% at 40° C. and from 0 to about 15% at 50° C. The paraffin coat may comprise 20 to 90% by weight of the particle and may be from 100 to 1,500 microns thick. The coat prolongs the time in which particles encapsulated therewith may remain active in aqueous environments.

The encapsulated particle is made by spraying molten wax onto the particles in a fluidized bed. Liquid or powder cleaning compositions, particularly automatic dishwashing liquid detergents, may incorporate 0.01 to 20% by weight of the composition of the coated wax-encapsulated particles.

33 Claims, 3 Drawing Sheets

U.S. PATENT DOCUMENTS

| | | | |
|---|---|---|---|
| 4,111,826 | 9/1978 | Leigh et al. | 252/89 R |
| 4,126,573 | 11/1978 | Johnston | 252/99 |
| 4,126,717 | 11/1978 | Mazzola | 427/220 |
| 4,128,494 | 12/1978 | Schirmann et al. | 252/186 |
| 4,136,052 | 1/1979 | Mazzola | 252/94 |
| 4,327,151 | 4/1982 | Mazzola | 428/407 |
| 4,421,664 | 12/1983 | Anderson et al. | 252/94 |
| 4,421,669 | 12/1983 | Brichard | 252/186.25 |
| 4,444,674 | 4/1984 | Gray | 252/95 |
| 4,486,327 | 12/1984 | Murphy et al. | 252/94 |
| 4,639,326 | 1/1987 | Czempik et al. | 252/91 |
| 4,655,780 | 4/1987 | Chun et al. | 8/108.1 |
| 4,657,784 | 4/1987 | Olson | 427/213 |
| 4,678,594 | 7/1987 | Parfomak et al. | 252/186.31 |
| 4,681,695 | 7/1987 | Divo | 252/94 |
| 4,707,160 | 11/1987 | Chun et al. | 8/101 |
| 4,711,748 | 12/1987 | Irwin et al. | 264/117 |
| 4,713,079 | 12/1987 | Chun et al. | 8/101 |
| 4,731,195 | 3/1988 | Olson | 252/174.13 |
| 4,759,956 | 7/1988 | Amer et al. | 427/213 |
| 4,762,637 | 8/1988 | Aronson et al. | 252/99 |
| 4,828,746 | 5/1989 | Clauss et al. | 252/90 |
| 4,863,632 | 9/1989 | Aronson et al. | 252/186.35 |
| 4,917,811 | 4/1990 | Foster et al. | 252/95 |
| 4,917,813 | 4/1990 | Aoyagi et al. | 252/99 |
| 4,919,841 | 4/1990 | Kamel et al. | 252/186.26 |
| 5,108,641 | 4/1992 | Ahmed et al. | 252/94 |
| 5,133,892 | 7/1992 | Chun et al. | 252/90 |

OTHER PUBLICATIONS

JP 61/212,383–Derwent Abstract No. 4285542 20 Sep. 86.

JP 74/045,134–Derwent Abstract No. 1351129 (Ricoh) 2 Dec. 74.

JP 52/076,339–Derwent Abstract No. 1835432 (Saiden Chemical) 27 Jun. 77.

JP 61/152,799–Derwent Abstract No. 4218669 (Nikka) 11 Jul. 86.

DE 2,115,081 (Henkel)–Derwent Abstract No. 906609 29 Mar. 71.

DE 1,927,389 (Hoechst)–Derwent Abstract No. 751377 3 Mar. 77.

Copending application: Batal et al.–S/N 07/494,713–Filed Mar. 16, 1990.

EP 390,287–Derwent Abstract No. 5755682 3 Jan. 90.

EP 376,360–Derwent Abstract No. 5659238 4 Jul. 90.

EP 320,219–Derwent Abstract No. 5252826 14 Jun. 89.

Copending application: Garcia et al. Ser. No. 07/543,640—Filed Jun. 26, 1990.

Copending application: Emery et al. Ser. No. 07/495,548—Filed Mar. 19, 1990.

Copending application: Emery et al. Ser. No. 07/604,030—Filed Oct. 24, 1990.

Copending application: Elliott Ser. No. 07/157,425—Filed Feb. 17, 1988.

Copending application: Corring et al. Ser. No. 07/139,492—Filed Dec. 30, 1987.

Jones, D. M., "Factors to Consider in Fluid-Bed Processing", Pharmaceutical Technology, (Apr. 1985).

Millier, W. J. et al., J. of Am. Oil Chemists' Society (Jul. 1969).

Unmuth, G. E. "Petrolelum Waxes", Wax Technology (selected reference pages).

WAX-ENCAPSULATED PARTICLES

RELATED APPLICATIONS

This is a continuation-in-part application of Ser. No 07/688,691 filed Apr. 24, 1991, now U.S. Pat. No. 5,230,822, which is a continuation-in-part of Ser. No. 563,732 filed on Aug. 3, 1990, now abandoned which is a continuation-in-part application of Ser. No. 436,996 filed on Nov. 15, 1989, now abandoned.

FIELD OF THE INVENTION

This invention concerns solid core materials which are paraffin wax-encapsulated to form particles which remain stable for use in liquid and granular cleaning products Also included is a method for encapsulating the core materials.

BACKGROUND OF THE INVENTION

Solid core materials which may be encapsulated for use in cleaning products include bleach (both oxygen and chlorine), enzymes, peracid precursors, bleach catalysts and surfactants. A variety of materials and methods have been used to coat such materials with the majority of effort directed to bleach and enzyme encapsulation technology. In particular, bleach particles were coated with fatty acids, polyvinyl alcohol or polyethylene glycols in U.S. Pat. No. 3,908,045 (Alterman et al.). U.S. Pat. No. 4,078,099, 4,126,717 and 4,136,052 (Mazzola) teaches coated bleach particles with a mixture of 35-89% by weight fatty acid and 1-16% by weight microcrystalline wax, the wax having melting point of 51°-99° C. Other coating materials used with bleach have included polymer latex, U.S. Pat. No. 4,759,956 (Amer et al.); polycarboxylate materials U.S. Pat. No. 4,762,637 (Aronson et al.); polyethylene waxes of melting point 50°-65° C. EP 132,184 (Scotte); and various waxes, U.S. Pat. No. 4,421,669 (Brichard). The wax coat in Brichard constitutes 0.01-10% of the weight of the bleach to be coated.

Enzymes and bleach were coated with ethylene vinyl acetate, fatty acid, natural waxes, a synthetic resin or an inorganic coating in U.S. Pat. No. 4,421,664 (Ecolab). Other materials used to encapsulate enzymes include silicone oil, petroleum jelly or alcohol waxes, GB 2 186 884 (Albright and Wilson).

Precursors used in cleaning compositions were encapsulated with liquid paraffin waxes and polyvinyl alcohol in U.S. Pat. No. 4,009,113 (Lever).

It was observed that such conventionally coated cores were unstable in aqueous or moist environments and would become inactive prior to use in the cleaning compositions.

In particular, coated bleach particles are unstable in liquid aqueous cleaning compositions because water or other components of the composition which are incompatible with bleach interact with the bleach during storage. The result is little bleach activity remains as a cleaning agent Similarly, bleach precursors, catalysts, and enzymes are relativity unstable in many liquid aqueous cleaning compositions. Although surfactants are liquid stable they are bleach sensitive and will become unstable in the presence of bleach.

Attempts have been made to increase the stability of encapsulated particles by applying a second coat Thus Alterman et al. taught optionally applying a second coat of soap to an encapsulated bleach And U.S. Pat. No. 4,657,784 (Olson) taught double coating a bleach core in an inner coat of paraffin or microcrystalline waxes having melting points of 40°-94° C. and a second coat of material such as sodium carbonate. Encapsulating bleach in an inner coat of fatty acid or waxes and an outer coat of water soluble cellulose ether has also been taught, European Patent Application 307,587 (Olson). Second coats are thought to improve stability of capsules of bleach and other materials, because fissures or gaps in the first coat may allow materials to contact and react with the active core.

These second coats suggested in the art are costly to apply and, while they raise the stability somewhat, do not guarantee that the active material will be available as a cleaning agent after storage.

A variety of methods have been used to encapsulate materials used in cleaning compositions. U.S. Pat. No. 3,847,830 (Williams et al.) describes several methods for enveloping normally unstable peroxygen compounds in water dispersible coatings including paraffin waxes. A coating material is "water dispersible" if, within 30 minutes of adding 2 g of enveloped peroxygen compound to 1 liter of water at 15° C., at least 75% of the peroxygen compound is released. Three of the methods of Williams et al. require the enveloping agent to be molten prior to spraying onto the peroxygen particles in a fluidized bed. Two other methods involve dissolving the enveloping agent in an organic solvent and either spraying the resultant solution onto the particles or immersing them in the bulk solution to achieve coating. Disadvantages of these two methods are the expense of organic solvents and, more importantly, the associated environmental pollution problems.

U.S. Pat. No. 3,856,699 (Miyano et al.) describes a process of dispersing core particles under heating into a waxy material, cooling the resultant dispersion and crushing this into a powder. Thereafter, the powdered waxy material is agitated in an aqueous medium at a temperature higher than the melting point of the waxy material. Waxed core material is then passed into a non-agitated aqueous medium at a temperature lower than the melting point of the waxy material. U.S. Pat. No. 4,919,841 teaches the steps of dispersing active material in melted wax to form an active material/wax dispersion; adding the dispersion to water containing at least one surfactant and emulsifying the active material/wax dispersion for no longer than 4 minutes therein to form capsules; cooling immediately thereafter said capsules and retrieving the cooled capsules form the water to effect capsules of improved quality.

Bleach particles have also been directly sprayed with coating material in fluidized bed apparatuses, as in Brichard. Thus in U.S. Pat. No. 3,908,045 fatty acid coating material was sprayed onto particles. And in U.S. Pat. No. 3,983,254 the spray height of the spray nozzle above the fluidized bed was said to be critical. In U.S. Pat. No. 4,078,099 a rotating drum device was used to apply coating material. Also in U.S. Pat. No. 4,759,956 polymeric latex was sprayed onto core materials (such as bleach) in a fluidized bed operated in a "Wurster" mode.

OBJECTS OF THE INVENTION

One object of the invention is to provide a single-co. encapsulated particle which has improved stability to degradation by ambient humidity or aqueous liquid media, or in the presence of bleach.

Another object is providing wax encapsulated particles which have a smooth, uninterrupted coating with excellent surface integrity.

A further object is producing such encapsulated particles by a process which avoids improper coating and the resultant problems of poor stability and particle agglomeration.

Another object is to provide an encapsulated core having a coat which melts or softens sufficiently to release the active core early in most automatic dishwashing wash cycles.

A still further object of the invention is to provide an encapsulation process which is free of organic solvents that lead to environmental pollution problems.

Another object of the invention is to provide a process which operates with a minimum of processing steps.

Another object is to increase the stability of the wax encapsulates at temperature extremes during storage or transport by including wax additives or top coating with selected materials.

Yet another object of the invention is to provide a liquid or solid cleaning composition containing the aforementioned single coat wax encapsulated particle, which capsule imparts stable activity without leaving waxy soil after washing. An even more specific object is to provide stable bleach, enzymatic, peracid precursor, catalytic or surfactant activity to machine liquid dishwashing or other hard surface cleaner which also contain incompatible components such as perfumes, colorants, builders, structurants and surfactants or bleach.

These and other objects of the present invention will become apparent as further details are provided in the subsequent discussion and Examples.

SUMMARY OF THE INVENTION

In a first aspect, the invention comprises an encapsulated solid core particle suitable for use in household and industrial cleaning products. Such core materials include bleach, enzymes, peracid precursors, bleach catalysts and surfactants. Without encapsulation, all of these materials are unstable in a liquid environment or in the presence of bleach. Additionally, one or more of the core materials may be independently encapsulated and added to a liquid cleaning composition.

The core of these particles can constitute from 10-80% by weight, preferably from 45-65% by weight, and more preferably 50-60% by weight of the final particles (i.e., the core plus the coat). A single wax coat on the particles can comprise the balance of 20-90% by weight, preferably 35-55% by weight of the particle, and more preferably 40-50% by weight, and is selected from one or more low melting point paraffin waxes having melting points of from about 40° C. to about 50° C. and having a solids content of from about 35% to 100% at 40° C. and a solids content of from 0 to about 15% at 50° C. The single wax coat preferably having thickness of 100 to 1,500 microns is applied to the particles. Preferably, the coat thickness is from 200 to 750 microns and most preferably from 200 to 600 microns.

In a second aspect, the invention comprises a process of making the encapsulated core particles. This process comprises the steps of spraying molten paraffin wax having low melting point, i.e., melting point of from about 40° C. to about 50° C. and a solids content of about 35% to 100% at 40° C. and 0 to about 15% at 50° C., on to uncoated particles in a fluidized bed. The bed temperature may be no higher than the melting point of the wax, preferably from 5° C. up to about 5° C. less than the melting point of the wax. The atomization temperature of the molten wax being applied to the particles should be sufficient to melt all the wax and preferably is at least 5° C. greater than the melting point of the wax. A single wax coat preferably having a thickness of 100 to 1,500 microns thick is applied to the particles. The rate of application of the wax and the time should be sufficient to apply the coat to the desired thickness and is preferably from 10 to 40 grams per minute per kilogram of bleach particles in the fluidized bed. The size of the core particles should range from about 100 microns to about 2,500 microns and materials which are not granules such as the peracid precursors and catalysts should be formed into core particles prior to coating.

The fluidized bed may be operated in the top spray or Wurster spray mode. Where the top spray is used, an annealing step may advantageously follow the coating step in order to impart an uninterrupted surface and excellent surface integrity to the coat. When the fluidized bed is operated in the Wurster spray mode, no annealing step is necessary.

In preferred embodiments wax additives or top coatings are used to increase the stability of the wax encapsulates.

In a third aspect, the invention comprises cleaning compositions which include 0.1 to 20% by weight of the composition of these encapsulated particles including bleach, enzymes, peracid precursors, bleach catalysts or surfactants. The compositions may further comprise 0.1-70% builder, 0.1-40% alkalinity agents and other components. These compositions leave little or no waxy soil on surfaces they clean.

DETAILED DESCRIPTION OF THE INVENTION

The Encapsulated Particle

Core Materials

Figure 1:
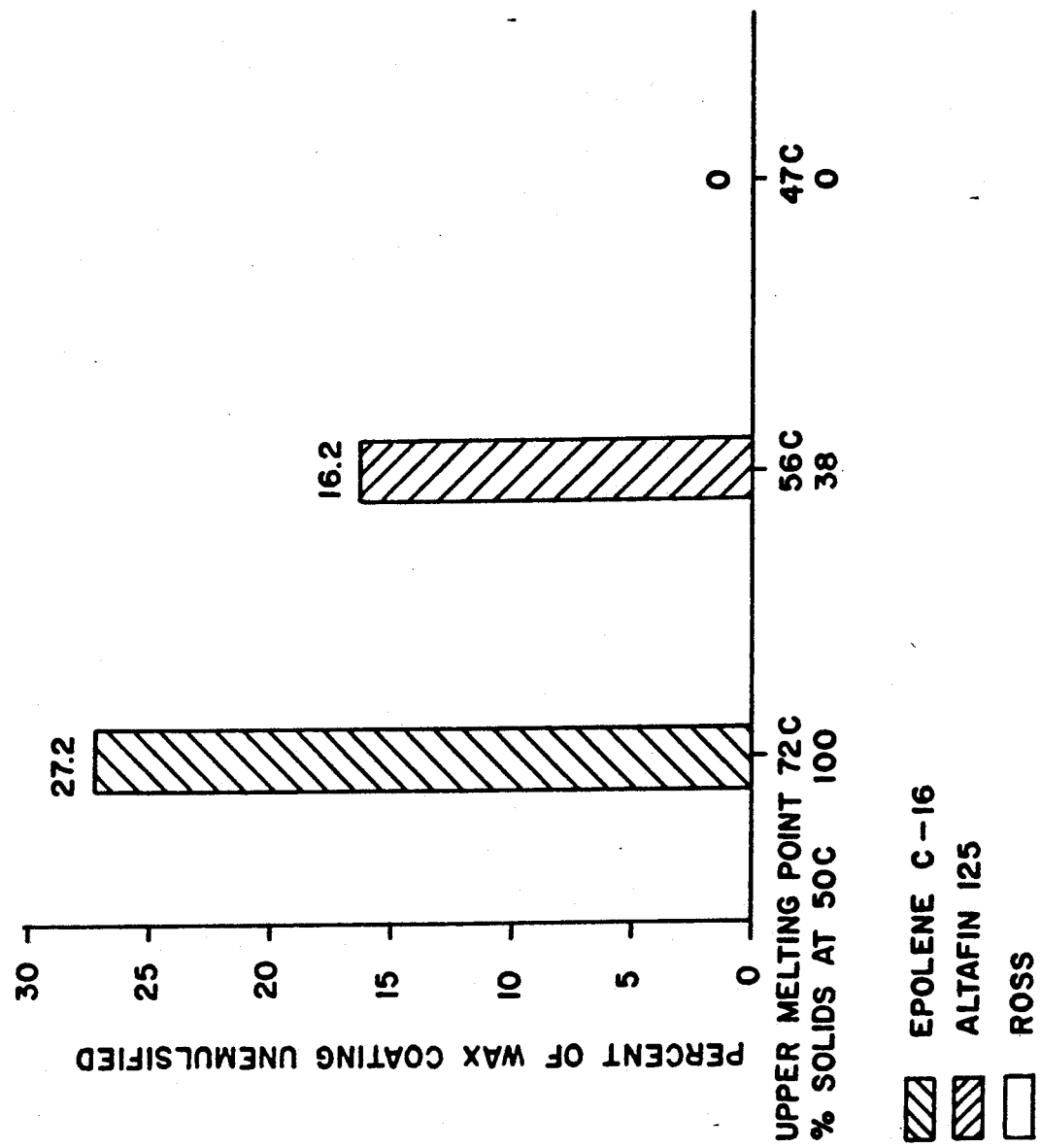
FIG. 1 is a graph of the amount of wax coating of a bleach core which remains unemulsified through an automatic dishwashing cycle, as described in Example III.

The term "solid core" materials used in cleaning products which may be encapsulated in the invention means those components which are unstable in the presence of a bleaching agent in liquid or humid environments or a bleaching agent which is unstable in an aqueous environment, in particular in an alkaline aqueous environment. All of these materials will lose activity without a paraffin wax coating according to the invention. Core materials within the scope of the invention include non-friable solid materials which are water soluble or water dispersible or which dissolves, disperses or melts in the temperature range of 40°-50° C. Such core materials include bleach, enzymes, peracid precursors, bleach catalysts, surfactants and perfumes.

The encapsulated core particle of the invention normally comprises 20-90% by weight of a single coat of paraffin wax and 10-80% by weight of a solid core material suitable for use in household and industrial strength cleaning compositions. Preferably the paraffin wax coating comprises 40-60% by weight of the particle and the core 40-60% by weight of the particle. Most preferably the coating comprises 40-50% by weight of the particle and the core 50-60% by weight of the particle.

In the preferred embodiment, the shape of the core is spherical or as close to this geometry as possible. It is further preferred to have a core particle size of 100-2,500 microns and more preferably from 500-1,500 microns in diameter.

Some of the core materials may be obtained commercially in a form which meets the preferred physical characteristics, such as, for example, solid bleach agents such as ACL ® compounds from the Monsanto Company of North Carolina, and CDB from Olin Company of New Haven, Conn., and various enzyme marumes, obtained from Novo Industri A/S of Copenhagen, Denmark.

Many of the other active core materials specified above are not commercially available with these preferred characteristics. It is then beneficial to produce composite core particles consisting of the active core ingredient and an agglomerating agent. The agglomerating agent must be stable and inert with respect to the active material. It also should not melt below 40° C. to ensure stability during storage and encapsulation. The agent must also either be soluble or dispersible in alkaline solution or melt completely above 50° C. so that optimum performance is realized during consumer use. Optionally, an inert material meeting the same specifications as the agglomerating agent may be added to the agglomerated core particles.

Bleach

When the core material is a bleach to be encapsulated in the paraffin wax coating, the bleach may be a chlorine or bromine releasing agent or a peroxygen compound. Among suitable reactive chlorine or bromine oxidizing materials are heterocyclic N-bromo and N-chloro imides such as trichloroisocyanuric, tribromoisocyanuric, dibromoisocyanuric and dichloroisocyanuric acids, and salts thereof with water-solubilizing cations such as potassium and sodium. Hydantoin compounds such as 1,3-dichloro-5,5-dimethylhydantoin are also quite suitable.

Dry, particulate, water-soluble anhydrous inorganic salts are likewise suitable for use herein such as lithium, sodium or calcium hypochlorite and hypobromite. Chlorinated trisodium phosphate is another core material. Chloroisocyanurates are, however, the preferred bleaching agents. Potassium dichloroisocyanurate is sold by Monsanto Company as ACL-59 ®. Sodium dichloroisocyanurates are also available from Monsanto as ACL-60 ®, and in the dihydrate form, from the Olin Corporation as Clearon CDB-56 ®, available in powder form (particle diameter of less than 150 microns); medium particle size (about 50 to 400 microns); and coarse particle size (150-850 microns). Very large particles (850-1700 microns) are also found to be suitable for encapsulation.

Organic peroxy acids and diacyl peroxides may be utilized as the bleach core. The peroxy acids usable in the present invention are solid compounds and substantially stable in the temperature range of about 40° C. to about 50° C.

Typical monoperoxy acids useful herein include alkyl peroxy acids and aryl peroxy acids such as:
(i) peroxybenzoic acid and ring-substituted peroxybenzoic acids, e.g. peroxy-alpha-naphthoic acid, and magnesium monoperphthalate
(ii) aliphatic and substituted aliphatic monoperoxy acids, e.g. peroxylauric acid, peroxystearic acid and 6-(N-phthalimido)peroxyhexanoic acid.

Typical diperoxy acids useful herein include alkyl diperoxy acids and aryldiperoxy acids, such as:
(iii) 1,12-diperoxydodecanedioic acid
(iv) 1,9-diperoxyazelaic acid
(v) diperoxybrassylic acid; diperoxysebacic acid and diperoxyisophthalic acid
(vi) 2-decyldiperoxybutane-1,4-dioic acid.

A typical diacylperoxide useful herein includes dibenzoylperoxide.

Inorganic peroxygen compounds may also be suitable as cores for the particles of the present invention. Examples of these materials are salts of monopersulfate, perborate monohydrate, perborate tetrahydrate, and percarbonate.

Enzymes

Enzymes which are capable of facilitating removal of soils from a substrate are also suitable cores for the particle of the present invention. Such enzymes include proteases (e.g., Alcalase ®, Savinase ® and Esperase ® from Novo Industries A/S), amylases (e.g. Termamyl ® from Novo Industries A/S), lipases (e.g., Lipolase ® from Novo Industries A/S) and oxidases.

Bleach Catalysts

Bleach catalysts are also suitable as the core material of the present invention. Such suitable catalysts include a manganese (II) salt compound as described in U.S. Pat. No. 4,711,748. Other suitable catalysts are described in Ser. No. 07/497,709 filed on Mar. 16, 1990 by Batal et al. describing N-sulfonyloxyziridine compounds and Ser. No. 07/494,713, filed on Mar. 16, 1990 by Batal et al. describing sulfonimine compounds, herein incorporated by reference. The catalysts may be admixed with, or adsorbed upon other compatible ingredients. Product formulations containing encapsulated bleach catalysts of the present invention may also contain a bleaching agent whose action is to be catalyzed. The bleaching agent may also be optionally encapsulated according to the present invention.

Peroxygen Bleach Precursors

Peracid precursors, preferably in granular form of size from 100 to 2,500 microns, preferably 500 to 1,500 microns are also suitable as cores for the particles of the present invention. Peracid precursors are compounds which react in the bleaching solution with hydrogen peroxide from an inorganic peroxygen source to generate an organic peroxy acid. They are also susceptible to hydrolysis, and cannot normally be formulated directly into aqueous cleaning compositions. Peracid precursors, encapsulated according to the present invention, would be incorporated into products along with a source of hydrogen peroxide, which also could optionally be encapsulated according to the present invention.

Peracid precursors for peroxy bleach compounds have been amply described in the literature, including in British Nos. 836,988; 855,735; 907,356; 907,358; 907,950;

1,003,310 and 1,246,339; U.S. Pat. Nos. 3,332,882 and 4,128,494; Canadian No. 844,481 and South African No. 68/6,344.

Typical examples of precursors are polyacylated alkylene diamines, such as N, N, N', N'- tetraacetylethylene diamine (TAED) and N, N, N', N'- tetraacetylmethylene diamine (TAMD); acylated glycolurils, such as tetraacetylglycoluril (TAGU); triacetylcyanurate, sodium sulphophenyl ethyl carbonic acid ester, sodium acetyloxybenzene sulfonate (SABS), sodium nonanoyloxybenzene sulfonate (SNOBS) and choline sulfophenyl carbonate.

Peroxybenzoic acid precursors are known in the art, e.g., from GB-A-836988. Examples thereof are phenylbenzoate; phenyl p-nitrobenzoate; o-nitrophenyl benzoate; o-carboxyphenyl benzoate; p-bromophenyl benzoate; sodium or potassium benzoyloxybenzenesulfonate; and benzoic anhydride.

Preferred peroxygen bleach precursors are sodium p-benzoyloxybenzene sulfonate, N, N, N', N'- tetracecetylethylene diamine, sodium nonanoyloxybenzene sulfonate and choline sulfophenyl carbonate.

In another embodiment, this invention provides a means of protecting bleach sensitive surfactants from an aqueous solution of bleach by encapsulating the surfactant with a wax coating according to the subject invention. This embodiment is particularly useful in an automatic dishwashing liquid formulation in which the aqueous phase contains sodium hypochlorite, and the surfactant is a nonionic surfactant, for example, an alkoxylated alcohol. In such an application, it may be necessary to first absorb the surfactant onto a solid carrier, particularly if the surfactant is a liquid or a low melting solid. Suitable carriers for surfactants are disclosed in Dittmer et al., GB 1,595,769 and Czempik et al. in U.S. Pat. No. 4,639,326, herein incorporated by reference.

Coating Material

The coating materials which are suitable for encapsulating the core particles are paraffin waxes which have low melting points i.e., between about 40° C. and about 50° C. and a solids content of from about 35 to 100% at 40° C. and a solids content of from 0 to about 15% at 50° C.

This melting point range for the coating is desirable for several reasons. First, the minimum of 40° C. generally exceeds any storage temperatures that are encountered by cleaning compositions. Thus, the wax coat will protect the core throughout storage of the cleaning composition. The 50° C. melting point cap for the wax coat was selected as providing a wax which will quickly melt or soften early in any automatic dishwashing wash cycle. Melting or softening sufficient to release the core will occur because operating temperatures in automatic dishwashers are usually between 40° and 70° C. Thus, the paraffin waxes of the invention will release the core material when the capsule is exposed to the warmed wash bath, but not before. Paraffin waxes are selected over natural waxes for the subject invention because in liquid alkaline environments, natural waxes hydrolyze and are unstable.

Moreover, melted paraffin waxes of the capsules of the invention will remain substantially molten at 40°-50° C. Such molten wax is easily emulsified by surfactant elements in cleaning compositions. Consequently, such waxes will leave less undesirable waxy residue on items to be cleaned than waxes with higher melting points.

As a class, paraffin waxes have a melting point range of roughly 30° to 80° C. and are constituted largely of normal alkanes with low levels of isoalkanes and cycloalkanes. Isoalkanes and cycloalkanes contribute to lack of order in solid wax structures and paraffin waxes are largely crystalline when solid.

Thus, the wax coat should not include any paraffins having a melting point substantially above 50° C., lest the higher melting point components remain solid throughout the wash cycle and form unsightly residues on surfaces to be cleaned nor any paraffins with solid contents discussed below.

The distribution of alkanes in a paraffin wax is determined by the initial crude petroleum stock and the refining process used to obtain each product grade. A wide distribution of normal alkanes in the paraffin wax which may also contain a significant level of isoalkanes and cycloalkanes falls outside the scope of the invention. Therefore, paraffin waxes having an average melting point between 40° C. and 50° C. are not suitable for the claimed invention if the solids contents of the wax falls outside the defined range. The distribution of solids of the paraffin waxes of the invention ensures storage integrity of the encapsulated particles at temperatures up to 40° C. in either a liquid or moist environment while yielding good melting performance to release its active core during use at temperatures of about 50° C.

The amount of solids in a wax at any given temperature as well as the melting point range may be determined by measuring the latent heat of fusion of each wax by using Differential Scanning Calorimetry (DSC) by a process described in Miller, W. J. et al. Journal of American Oil Chemists, Society, July, 1969, V. 46, No. 7, page 341–343, incorporated by reference. This procedure was modified as discussed below. DSC equipment used in the procedure is preferably the Perkin Elmer Thermoanalysis System 7 or the Dupont Instruments DSC 2910.

Specifically, the DSC is utilized to measure the total latent heat of fusion of multi-component systems which do not have a distinct melting point, but rather, melt over a temperature range. At an intermediate temperature within this range one is capable of determining the fraction of the latent heat required to reach that temperature. When acquired for a multi-component mixture of similar components such as commercial waxes, this fraction correlates directly to the liquid fraction of the mixture at that temperature. The solids fraction for the waxes of interest are then measured at 40° C. and 50° C. by running a DSC trace from −10° C. to 70° C. and measuring the fraction of the total latent heat of fusion required to reach these temperatures. A very low temperature ramping rate of 1° C./min should be used in the test to ensure that no shifting of the graph occurs due to temperature gradients within the sample.

The more solids present in a wax at room temperature, the more suitable the wax is for the present invention; this is because such solids strengthen the wax coating, rendering the particle less vulnerable to ambient moisture or a liquid aqueous environment, whereas "oil" or liquid wax softens the wax, opening up pores in the coating and thereby provides poorer protection for the core of the particle. Significant solid paraffin remaining at 50° C. may remain on the cleaned hard surfaces (e.g. dishware in an automatic dishwashing machine) and is undesirable.

Therefore, the wax solids content as measured by Differential Scanning Calorimetry for suitable paraffin waxes may range from 100 to about 35%, optimally from 100 to about 70%, at 40° C. and from 0 to about 15%, and preferably 0 to about 5% at 50° C.

In contrast to paraffin waxes, micro-crystalline waxes have generally higher molecular weights and melting points. Thus the melting point range for micro-crystalline waxes is from about 50° to 100° C. Moreover, micro-crystalline waxes are more viscous in the molten state than paraffin waxes and softer than paraffin waxes when solid. Particles coated with micro-crystalline waxes would therefore have a poorer protective coating, and the wax coat which melts from such particles would be less likely to emulsify in cleaning compositions. Thus, micro-crystalline waxes are not considered within the operative scope of this invention.

Commercially available paraffin waxes which are suitable for encapsulating the solid core materials include Merck 7150 (54% solids content at 40° C. and 0% solids content at 50° C.) and Merck 7151 (71% solids content at 40° C. and 2% solids content at 50° C.) ex E. Merck of Darmstadt, Germany; Boler 1397 (74% solids content at 40° C. and 0% solids content at 50° C.) and Boler 1538 (79% solids content at 40° C. and 0.1% solids content at 50° C. ex Boler of Wayne, Pa.; and Ross fully refined paraffin wax 115/120 (36% solids content at 40° C. and 0% solids content at 50° C.) ex Frank D. Ross Co., Inc. of Jersey City, N.J. Most preferred is Boler 1397.

Wax Additives

Due to the high crystallinity of the paraffin waxes within the scope of the invention the coatings produced are often susceptible to cracking when subjected to very low temperatures around −18° C. To increase the stability of the encapsulates under these conditions wax additives may preferably be added to the wax coating at minor levels. Suitable additives must achieve the following results when dosed at a given level to the wax coating material:

a. Blend homogeneously with the molten wax.
b. The coating blend must remain within the level of solids limits as described by the DSC scan, i.e. the thermal properties of the wax must not be significantly changed.
c. Increase the ability of the paraffin wax to expand and contract without cracking.
d. The impermeability of the wax coating to aqueous environments must remain nearly unchanged.
e. The viscosity of the molten blend must remain nearly unchanged so that the atomization and spreading of the coating on the particle surface will not be significantly affected.

Within these constraints, several wax additives have been shown to be effective at increasing stability of the encapsulates stored within cycled temperature conditions of −18°-21° C. A list of suitable additives include copolymers of ethylene and vinyl acetate, such as Elvax series from DuPont hydrogenated methyl ester of rosin, polyethylene, synthetic waxes such as Paraflint ® distributed by Moore & Munger Marketing of Shelton, Conn.; Vybar ® olefin derived hydrocarbon polymers from Petrolite of Tulsa, Okla.; and ethyl acrylate and 2 ethylhexyl acrylate copolymer PC-1344 ® from Monsanto. A preferred additive is the hydrogenated methyl ester of rosin known as Hercolyn D ® from Hercules Inc. of Wilmington, Del. It is noted that ethylene maleic anhydride copolymers and polyethylenes will improve coating stability under these thermal conditions but also increase the permeability of the coating making the resulting particles less suitable for incorporation in a liquid environment. A demonstration of the improved stability of the encapsulates due to the wax additive while maintaining critical thermal properties is given in Example XV.

The Process of Encapsulating Solid Core Particles

The process steps of encapsulating the solid core particles comprise:

a) selecting a core material to be encapsulated,
b) optionally agglomerating the selected core material to form a particle having a diameter of 100 to 2,500 microns,
c) suspending the particles in a fluid bed,
d) selecting one or more paraffin waxes to provide the coating, the waxes having a melting point between about 40° C. and about 50° C., and a solids content of from 100% to about 35% at 40° C. and a solids content of from 0 to about 15% at 50° C.
e) heating the one or more paraffin waxes to a temperature sufficiently above the melting temperature to melt all the wax,
f) fluidizing the bed by passing warm air through the core particles, so as to maintain a bed temperature no higher than the wax melting point, and
g) spraying the melted paraffin wax onto the fluidized bed at an atomization temperature which is preferably at least 5° C. above the melting temperature of the wax for a time sufficient to form a continuous, coherent paraffin wax coating of a thickness of from 100 to 1,500 microns on the particles preferably from 200 to 750 microns.

The amount of coating applied to the core particles is typically from about 20 to 90%, preferably about 40 to 60% and most preferably 40–50% by weight of the total particle (i.e., core plus coating).

Agglomerating the Core Particles

As discussed above if the selected core material is not commercially available in an agglomerated form for use in the invention, there are several methods known in the art for producing such agglomerates. Such methods include softening or melting an agglomerating agent and contacting the softened or molten agglomerating agent with the selected core material in a pan granulator, a rolling drum, a fluid bed, or a falling curtain spray-on.

In a preferred preparation technique, the molten agglomerating agent having a temperature in the range from about 40° C. to 80° C. is sprayed onto the active core species in a pan granulator. An optional technique for this equipment is "wet granulation" where a solution of the agglomerating agent is sprayed onto the active particles while drying the material to slowly build bridges of agglomerating agent between the active material and produce agglomerates of the preferred characteristics.

In another preferred preparation technique, the core particles may be prepared in a high-speed mixer/granulator. The agglomerating agent must be stable and inert with respect to the active materials, should not melt below 40° C., and must be soluble or dispersible in an alkaline solution or melt completely above 50° C. Suitable agglomerating agents and processing conditions are described in EP 0,390,287 corresponding to U.S. Ser. No. 07/495,548 filed on Mar. 19, 1990 and Ser. No. 07/604,030, herein incorporated by reference.

Another approach for production of the core particles is to disperse the active agent uniformly in the agglomerating agent. The mixture is heated so that it is in a soft or molten state so that the mixture becomes a uniform dough. This dough is then extruded with an axial or radial extruder to form noodles which are cut to form small pellets. The pellets are produced to have the characteristics specified above. In an optional additional step, these pellets may be spheronized by a treatment in a machine known as a Marumerizer ® instrument distributed by Luwa Corporation of Charlotte, N.C. This spheronizing method is described in U.S. Pat. No. 4,009,113 herein incorporated by reference.

An additional approach is to spray the liquid active material, or a solution of the active material onto an inert base particle in a pan granulator, fluid bed, or rolling drum. In this approach the active agent is absorbed into the base particles, coated on the base particles, or used as an agglomerating agent for the base particles. Typical, but not exclusive, examples of inert base particles are the organic and inorganic water soluble builder and filler salts. This approach is particularly suited to production of many surfactant, peracid, and catalyst core particles.

Specific examples of agglomerating agents suitable for use with bleach or bleach activator components cited in this invention are disclosed in U.S. Pat. No. 4,087,369; U.S. Pat. No. 4,486,327,EP 0 376 360, U.S. Pat. No. 4,917,811, U.S. Pat. No. 4,713,079, U.S. Pat. No. 4,707,160, Ep 0 320 219, U.S. Pat. No. 4,917,813, and Ser. No. 07/543,640, filed on Jun. 26, 1990 by Garcia et al. describing polymer protected bleach precursors herein incorporated by reference. The weight ratio of bleach to the agglomerating agent is normally in the range 1:2 to 25:1, preferably from 2:1 to 10:1. The encapsulates formed from these agglomerated bleach or bleach activator core particles are normally dosed into the final product formulation at levels from 0.5% to 25%, preferably from 2% to 15%.

A typical catalyst included in core particles is a manganese (II) salt. An example of agglomerating agents and processing methods suitable for production of catalyst core particles cited in this invention are disclosed in U.S. Pat. No. 4,711,748, herein incorporated by reference. This patent teaches adsorbing manganese (II) salts onto an aluminosilicate support and wet granulation with various binders to form granules in the proper size range. The weight ratio of catalyst to the support material and agglomerating agent is normally in the range 1:10 to 1:200,000. The encapsulates formed from these agglomerated catalyst core particles are normally dosed into the final product formulation at levels from 0.001% to 5%.

Coating Process

There are several methods of operating a fluidized bed. In a common fluidized bed operation, air is introduced into the bed from below while the coating material is sprayed onto the fluidized material from above. The particles move randomly in the bed in this top spray operation.

An alternative method is the Wurster mode. In this method, the material is sprayed from the bottom of the bed cocurrently with the air flow. The particles move in a well-defined flow pattern as is known in the art.

Unless precautions are taken in applying molten coating materials in fluidized beds, the resulting material can be poorly coated or, alternatively, agglomerated together. These equally undesirable results follow from the temperature settings in operating the fluidized bed. For example, when the temperature of the bed is too far below that of the molten wax, the molten wax begins to solidify as soon as it enters the cool bed region. Thus, the wax loses some of its ability to adhere to the surface of the particles, and the wax itself quickly solidifies. When this occurs, the fluidized bed is operating to produce wax particles with little or no coating on the particle. The poorly coated particles consequently have little stability from ambient humidity or an aqueous liquid environment. Alternatively, when the bed temperature is too high, the wax which does contact the particles fails to cool sufficiently and so remains soft and sticky. Consequently, particles clump and agglomerate. It becomes difficult to control the size of the resulting clumps which can result in unacceptable properties for use in consumer products, such as dispensing problems. Additionally, agglomerates may easily break apart during handling to expose the core material to the environment. Thus, improper control of the fluidized bed temperatures can produce encapsulated bleach which fails to meet one of the objects of the invention.

Applicants have discovered that, even with the coatings of up to 1,500 micron thickness, proper control of the bed temperature and the atomization temperature in a fluidized bed avoids agglomeration. Thus, when the bed temperature is from 20° C. to no higher than the melting point of the wax, "spray drying" of the wax and agglomeration of coated particles is reduced. Preferably, the bed temperature is 20° to 35° C. and most preferably 25° to 32° C.

Applicants have further discovered that atomization temperature, or the temperature at which the wax is sprayed from a nozzle onto the fluidized bed, is advantageously held at least about 5° to 10° C. above the melting temperature of the wax. When the top spray mode is used, the maximum atomization temperature is about 35° C. greater than the wax melting point; above this temperature, too great a percentage of the particles agglomerate. When the Wurster mode is used to coat particles, the atomization temperature may be as high as 50° C. and more above the wax melting point temperature. This is found to be a practicable atomization temperature despite the expectation that partially coated particles with molten coats would stick to the spray nozzle. It is instead found that the air flow is strong enough to detach these partially coated particles. Alternatively, applicants have found that the temperature of the molten wax may be maintained substantially above the wax melting point, e.g. from 50° to 100° C. above the melting point. When this is the case, the atomization temperature is preferably near the melting temperature of the wax, in order to lower the wax temperature sufficiently to solidify quickly on the particles in the fluidized bed.

When using the top spray mode for encapsulation, applicants have discovered that performing an additional annealing step after coating the particles in a top spray fluidized bed further improves the capsules. "Annealing" is the name given to a further heating of wax-encapsulated bleach particles at a temperature greater than room temperature but below the wax melting point. This heating step is performed with the bed being fluidized, i.e., with warm air flowing through it; however, no molten wax is being sprayed on to the particles during annealing. The annealing step renders the wax mobile enough that it fills in gaps and cracks in its surface, thus providing a better seal to the bleach within.

The temperature chosen for annealing is one which softens the wax without rendering it sticky. Typically, this temperature is from 5° to 15° C. greater than the bed temperature during coating, and from 3° to 15° C. less than the melting point of the wax coating. For example, when the wax has a melting point of 46° C., the annealing temperature may be about 33°-34° C. The bed temperature during spraying is only about 31°-32° C, for above 32° C. there is a good chance the particles will agglomerate i.e., the high temperature of the molten wax, combined with an annealing temperature, would so soften the wax that particles would agglomerate in the fluidized bed. However, when no hot molten wax is being sprayed on the particles, an annealing temperature alone in the bed is not warm enough to cause agglomeration.

Most preferably, annealing should be performed for a period of between 10 minutes and 48 hours, optimally between about 1 and 24 hours. Mixing the capsules with an inert material, such as an amorphous silica, alumina or clay, prevents capsule sticking during the annealing process. Incorporation of the inorganic annealing adjunct allows use of higher temperatures during the annealing process, thus shortening the annealing period. Adjuncts may be used in an amount relative to the weight of the overall capsule in the ratio of 1:200 to 1:20, preferably 1:100 to 1:30.

A preferred alternative to the top spray of molten coating material is the Wurster spray mode. This method is described in detail in U.S. Pat. No. 3,253,944, which is hereby incorporated by reference. In general, fluidized beds are characterized by randomness of particle motion. Random motion is undesirable when coating particles because of the resultant slow coating rates. To overcome this problem, a cyclic flow pattern is established in the Wurster spray mode by controlled velocity differences.

The Wurster mode involves use of a vertically disposed coating tower wherein particles are suspended in an upwardly flowing air stream entering the bottom of the tower. This air stream imparts controlled cyclic movement to the particles with a portion of the suspended bed flowing upwardly inside the tower and the other portion downwardly outside the tower. All of the coating material is directed into the high velocity air stream to provide coating of the particles moving upwardly in the tower. The fluid coating solidifies on the surface of the particles as the air stream lifts them away from the nozzle. The particles are carried to the top of the tower from which point they fall to the base of the tower along a path outside the tower. At the base, the particles are drawn in through openings and redirected upwardly in the air stream inside the tower. This cycle is repeated until the desired amount of coating has been deposited on the particles.

Given the steps of Wurster, it was believed that the Wurster mode would be inappropriate for encapsulating particles in wax. Additionally, conventional wisdom taught that the relatively slow movement of particles in the Wurster bed would result in agglomeration. Applicants surprisingly discovered that agglomeration in the Wurster mode is significantly lower then in the top spray mode. The spray nozzle for Wurster is located at the bottom of the fluidized bed and sprays coating materials upwards. It was believed this configuration of the spray nozzle would lead to clogging of the spray nozzle when coated and agglomerated particles fell from the upward air spray into the nozzle area. This risk seemed especially high because the nozzle temperature is generally above the melting point of the wax coating. However, applicants have surprisingly discovered that use of the Wurster spray mode results in many benefits.

When operated under optimum conditions, upwards to 5-15% of the particles coated by top spray may agglomerate, and so be unusable, whereas the level of agglomerated particles from the Wurster application of a fluidized bed rarely exceeds 2% of the particles.

It is generally preferred to use a wax spray-on rate of from about 10 to about 40 g/min/kg. for economic processing and good product quality. However, it has been found advantageous to use lower rates of spraying from about 1 to 10 g/min/kg. at the commencement of each batch, when the uncoated particles are relatively fragile and small, before increasing the spray-on rate to a higher level, so as to shorten the processing time. However, the lower rates can be employed throughout the spray-on process if desired, or if only thin wax coatings are required for specific products.

Moreover, the coating time with the Wurster configuration can take half as long as top spray, or less, even with a substantially lower air flow rate, as demonstrated in Example I below. Although batch size is often smaller than in top spray, and the rate of spraying wax onto the core is not substantially higher in the Wurster mode, still the production rate of the encapsulated particles may be as much as 2 to 3 times higher by the Wurster mode. This higher production rate may be maintained even when the air flow rate through the fluidized bed is lower than for the top spray mode. Thus, higher production rates with lower air flow rates in the Wurster mode produce particles with less agglomeration than the top spray mode.

A further advantage discovered by applicants in using the Wurster spray mode is that no annealing step is needed. More accurately, self-annealing occurs automatically as part of the coating process when the Wurster mode is used. The hot molten wax droplet contacting the partly coated bleach particle causes the solid wax already on the particle to melt and to fill any cracks in the wax surface. Unlike the spray-coated particles in top spray mode, which fall into a crowded mass of other particles in the fluidized bed, the particles in the Wurster mode move out of the spray tower and fall through the less crowded space outside the tower due to the well defined flow pattern of the particles in the Wurster mode. Thus, the particles have time to cool sufficiently before contacting other particles while cooling.

There are many commercially available fluid bed apparatuses which are suitable for use in the process of the invention; among these are the GPCG-5 and GPCG-60 models of Glatt Air Techniques of Ramsey, N.J. These two models can coat 8 to 225 kg loads of the particles in from 0.5 to 3 hours, respectively. Table top encapsulation may be carried out in laboratory scale apparatuses as well, as for example in Granuglatt Model No. WSG-3, ex Glatt Air Techniques.

Applicants were surprised to discover that encapsulated particles made by the process of the invention have improved stability to ambient humidity when in powder cleaning products and in aqueous media when in liquid products This increased stability results regardless of whether the particle is encapsulated by top spray or Wurster modes in the fluidized bed. The increased stability is demonstrated in Examples V, and VI & VIII.

Wax Additives

Applicants have additionally discovered that the addition of small amounts of a proper wax additive material to the paraffin coating wax greatly increase the stability of the encapsulates when subjected to wide temperature variations, in particular, low temperatures in the −18° C. range. A wax additive is a material which may be added to the wax coating to prevent cracking or unstable coating areas due to wide thermal variations. Encapsulates coated only with the specified paraffin waxes show low stability when subjected to temperature cycles of −18°-21° C. However, low levels of a wax additive, preferably 0.5 wt. % to 1 wt. %, may optionally be added to the wax coating to increase the stability of the encapsulates under these conditions while introducing only minor changes to the thermal properties of the wax and leaving it within the scope of the invention.

The wax additives are introduced by dissolving them in the molten wax or blending them in a molten state with the molten wax prior to spraying the wax coating onto the core particles. The process remains unchanged and is described previously. The improved stability is demonstrated in Example XV.

Powdered Materials Used as Top Coatings

In the present invention, the addition of a second coating of the proper material over the wax coating will reduce the compressibility of the particles. This addition is especially relevant for shipping and storage of bulk quantities of encapsulates in temperature ranges where the wax coating will begin to soften.

Capsules which have not been treated with the second coating may be compressed at temperatures as low as room temperature. The additional coating has been shown to increase the temperature at which the encapsulates begin to compress. Increasing compressibility is useful for shipping and storage of the wax encapsulates before they are added to liquid formulations.

The outer coatings are applied after the initial wax coating, and can consist of several materials which are either blended with the wax particles, or sprayed on in the same manner as the wax coating or by an alternate film coating technique. The coating materials must be selected so that they dissolve during the shelf-life of the product, or easily dissipate during the wash cycle and do not affect the performance of the encapsulates. The different coatings, the method of application, and the improved compressibility results are described in Examples XVI-XVIII below.

Material which are suitable for the invention include calcium silicate, silicon dioxide (also referred to as silica), sodium silicate, aluminum silicate and sodium aluminum silicate. Preferred materials are calcium silicate and silicon dioxide.

Examples of specific materials within the invention include:

| Trademark Material | Chemical Description | Average Particle Size (μ) | Surface Area (m²/g) | Supplier |
|---|---|---|---|---|
| Hubersorb 600 | Calcium Silicate | 3.2 | 300 | J. M. Huber |
| Sipernat 22S | Silicon Dioxide | 7.0 | 190 | Degussa |
| Aerosil R202 | Silicon Dioxide | 14.0 | 90 +/− 20 | Degussa |
| Zeothix 265 | Silicon Dioxide | 1.7 | 260 | J. M. Huber |

Preferably, the selected material has an average particle size of less than about 15 microns, most preferably less than about 5 microns for use in forming a substantially uniform coating on the wax coating.

Additional materials which may be used in the invention include a cellulose polymer and polyethylene glycol. Examples of suitable polymers include hydroxypropyl methyl cellulose (Methocel E5 supplied by Dow Chemical and Opadry supplied by Colorcon). An example of a preferred polyethylene glycol is Carbowax 4600 of the Carbowax series supplied by Union Carbide.

The Cleaning Compositions Incorporating the Encapsulated Particle

The wax encapsulated particles of the invention may be incorporated into a variety of powder and liquid cleaning compositions, such as automatic machine dishwashing, hard surface cleaners and fabric washing cleaners for both household and industrial use. Most of about 1-75% of a builder component an about 0 to about 40% of a surfactant, preferably about 0.5% to about 20% by weight of the composition.

The surfactant may be encapsulated according to the invention to prevent mutual degradation with bleach which is not coated in the formula. The encapsulated surfactant would be present in an amount of 0.1 to 5% by weight of the composition.

Wax-encapsulated chlorine bleach is especially suitable for automatic dishwashing liquid or "gel" detergent products where the encapsulated particles will normally be present in an amount of 0.1 to 20% by weight of the composition.

Other ingredients which may be present in the cleaning composition include cleaning enzymes, peracid precursors or bleach catalysts. Any one or more of these ingredients may also be encapsulated before adding them to the composition. If such ingredients are encapsulated they would be present in the following percentages by weight of the composition:

| | |
|---|---|
| enzyme | 0.1 to 5% |
| peracid precursor | 0.1 to 10% |
| bleach catalyst | 0.001 to 5% |
| peracid | 0.1 to 10% |

Automatic dishwashing detergent powders and liquids will usually have the compositions listed in Table I.

TABLE I

Automatic Dishwashing Detergent Compositions

| | Percent by Weight | |
|---|---|---|
| Components | Powder Formulation | Liquid Formulation |
| Builder | 0-70 | 0-60 |
| Surfactant | 0-10 | 0-15 |
| Filler | 0-60 | — |
| Alkalinity Agent | 0.1-40 | 0.1-30 |
| Silicate | 0-40 | 0-30 |
| Bleaching Agent | 0-20 | 0-20 |

TABLE I-continued

Automatic Dishwashing Detergent Compositions

| Components | Percent by Weight | |
|---|---|---|
| | Powder Formulation | Liquid Formulation |
| Enzyme | 0–5 | 0–5 |
| Bleaching Catalyst | 0–5 | 0–5 |
| Thickener | — | 0–5 |
| Bleach Scavenger | 0–5 | 0–5 |
| Perfume | 0–2 | 0–2 |
| Water | to 100 | to 100 |

Gels differ from liquids in that gels are primarily structured by polymeric materials and contain only low levels of clay.

Detergent Builder Materials

The cleaning compositions of this invention can contain all manner of detergent builders commonly taught for use in automatic dishwashing or other cleaning compositions. The builders can include any of the conventional inorganic and organic water-soluble builder salts, or mixtures thereof and may comprise 1 to 90%, and preferably, from about 5 to about 70% by weight of the cleaning composition.

Typical examples of phosphorus-containing inorganic builders, when present, include the water-soluble salts, especially alkali metal pyrophosphates, orthophosphates and polyphosphates. Specific examples of inorganic phosphate builders include sodium and potassium tripolyphosphates, phosphates, pyrophosphates and hexametaphosphates.

Suitable examples of non-phosphorus-containing inorganic builders, when present, include water-soluble alkali metal carbonates, bicarbonates, sesquicarbonates, borates, silicates, metasilicates, and crystalline and amorphous aluminosilicates. Specific examples include sodium carbonate (with or without calcite seeds), potassium carbonate, sodium and potassium bicarbonates, silicates and zeolites.

Particularly preferred inorganic builders can be selected from the group consisting of sodium tripolyphosphate, potassium pyrophosphate, sodium carbonate, potassium carbonate, sodium bicarbonate, sodium silicate and mixtures thereof. When present in these compositions, sodium tripolyphosphate concentrations will range from about 2% to about 40%; preferably from about 5% to about 30%. Sodium carbonate and bicarbonate when present can range from about 5% to about 50%; preferably from about 10% to about 30% by weight of the cleaning compositions. Sodium tripolyphosphate and potassium pyrophosphate are preferred builders in gel formulations, where they may be used at from about 3 to about 30%, preferably from about 10 to about 20%.

Organic detergent builders can also be used in the present invention. Examples of organic builders include alkali metal citrates, succinates, malonates, fatty acid sulfonates, fatty acid carboxylates, nitrilotriacetates, phytates, phosphonates, alkanehydroxyphosphonates, oxydisuccinates, alkyl and alkenyl disuccinates, oxydiacetates, carboxymethyloxy succinates, ethylenediamine tetracetates, tartrate monosuccinates, tartrate disuccinates, tartrate monoacetates, tartrate diacetates, oxidized starches, oxidized heteropolymeric polysaccharides, polyhydroxysulfonates, polycarboxylates such as polyacrylates, polymaleates, polyacetates, polyhydroxyacrylates, polyacrylate/polymaleate and polyacrylate/polymethacrylate copolymers, aminopolycarboxylates and polyacetal carboxylates such as those described in U.S. Pat. Nos. 4,144,226 and 4,146,495.

Alkali metal citrates, oxydisuccinates, polyphosphonates and acrylate/maleate copolymers are especially preferred organic builders. When present they are preferably available from about 1% to about 35% of the total weight of the detergent compositions.

The foregoing detergent builders are meant to illustrate but not limit the types of builder that can be employed in the present invention.

Surfactants

Surfactants may be preferably included in the household cleaning product incorporating the encapsulated particles. Such surfactants may be encapsulated or not for inclusion in the composition. Useful surfactants include anionic, nonionic, cationic, amphoteric, zwitterionic types and mixtures of these surface active agents. Such surfactants are well known in the detergent art and are described at length in "Surface Active Agents and Detergents", Vol. II, by Schwartz, Perry & Birch, Interscience Publishers, Inc. 1959, herein incorporated by reference.

Anionic synthetic detergents can be broadly described as surface active compounds with one or more negatively charged functional groups. Soaps are included within this category. A soap is a $C_8$–$C_{22}$ alkyl fatty acid salt of an alkali metal, alkaline earth metal, ammonium, alkyl substituted ammonium or alkanolammonium salt. Sodium salts of tallow and coconut fatty acids and mixtures thereof are most common. Another important class of anionic compounds are the water-soluble salts, particularly the alkali metal salts, of organic sulfur reaction products having in their molecular structure an alkyl radical containing from about 8 to 22 carbon atoms and a radical selected from the group consisting of sulfonic and sulfuric acid ester radicals. Organic sulfur based anionic surfactants include the salts of $C_{10}$–$C_{16}$ alkylbenzene sulfonates, $C_{10}$–$C_{22}$ alkane sulfonates, $C_{10}$–$C_{22}$ alkyl ether sulfates, $C_{10}$–$C_{22}$ alkyl sulfates, $C_4$–$C_{10}$ dialkylsulfosuccinates, $C_{10}$–$C_{22}$ acyl isethionates, alkyl diphenyloxide sulfonates, alkyl napthalene sulfonates, and 2-acetamido hexadecane sulfonates. Organic phosphate based anionic surfactants include organic phosphate esters such as complex mono- or diester phosphates of hydroxyl- terminated alkoxide condensates, or salts thereof. Included in the organic phosphate esters are phosphate ester derivatives of polyoxyalkylated alkylaryl phosphate esters, of ethoxylated linear alcohols and ethoxylates of phenol. Also included are nonionic alkoxylates having a sodium alkylenecarboxylate moiety linked to a terminal hydroxyl group of the nonionic through an ether bond. Counterions to the salts of all the foregoing may be those of alkali metal, alkaline earth metal, ammonium, alkanolammonium and alkylammonium types.

Nonionic surfactants can be broadly defined as surface active compounds with one or more uncharged hydrophilic substituents. A major class of nonionic surfactants are those compounds produced by the condensation of alkylene oxide groups with an organic hydrophobic material which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements. Illustrative, but not limiting examples, of various suitable nonionic surfactant types are:

(a) polyoxyethylene or polyoxypropylene condensates of aliphatic carboxylic acids, whether linear- or branched-chain and unsaturated or saturated, containing from about 8 to about 18 carbons atoms in the aliphatic chain and incorporating from about 2 to about 50 ethylene oxide and/or propylene oxide units. Suitable carboxylic acids include "coconut" fatty acids (derived from coconut oil) which contain an average of about 12 carbons atoms, "tallow" fatty acids (derived from tallow-class fats) which contain an average of about 18 carbons atoms, palmitic acid, myristic acid, stearic acid and lauric acid.

(b) polyoxyethylene or polyoxypropylene condensates of aliphatic alcohols, whether linear- or branched-chain and unsaturated or saturated, containing from about 6 to about 24 carbons atoms and incorporating from about 2 to about 50 ethylene oxide and/or propylene oxide units Suitable alcohols include "coconut" fatty alcohol, "tallow" fatty alcohol, lauryl alcohol, myristyl alcohol and oleyl alcohol Particularly preferred nonionic surfactant compounds in this category are the "Neodol" type products, a registered trademark of the Shell Chemical Company.

Also included within this category are nonionic surfactants having formula $$R-(CH_2CHO)_x(CH_2CH_2O)_y(CH_2CHO)_zH \qquad I$$
$$\phantom{R-(CH_2CHO)_x(CH_2CH_2O)_y(}R^1 \phantom{CH_2CHO)_y(}R^2$$

wherein R is a linear alkyl hydrocarbon radical having an average of 6 to 18 carbon atoms, $R^1$ and $R^2$ are each linear alkyl hydrocarbons of about 1 to about 4 carbons atoms, x is a integer of from 1 to 6, y is an integer of from 4 to 20 and z is an integer from 4 to 25.

A preferred nonionic surfactant of formula I is Poly-Tergent SLF-18 ® a registered trademark of the Olin Corporation, New Haven, Conn. having a composition of the above formula where R is a $C_6$-$C_{10}$ linear alkyl mixture, $R^1$ and $R^2$ are methyl, x averages 3, y averages 12 and z averages 16. Also suitable are alkylated nonionics as are described in U.S. Pat. No. 4,877,544 (Gabriel et al.), incorporated herein by reference.

Another nonionic surfactant included within this category are compounds of formula $$R^3-(CH_2CH_2O)_qH \qquad II$$

wherein $R^3$ is a $C_6$-$C_{24}$ linear or branched alkyl hydrocarbon radical and q is a number from 2 to 50; more preferably $R^3$ is a $C_8$-$C_{18}$ linear alkyl mixture and q is a number from 2 to 15.

(c) polyoxyethylene or polyoxypropylene condensates of alkyl phenols, whether linear- or branched-chain and unsaturated or saturated, containing from about 6 to 12 carbons atoms and incorporating from about 2 to about 25 moles of ethylene oxide and/or propylene oxide.

(d) polyoxyethylene derivatives of sorbitan mono-, di-, and tri-fatty acid esters wherein the fatty acid component has between 12 and 24 carbon atoms. The preferred polyoxyethylene derivatives are of sorbitan monolaurate, sorbitan trilaurate, sorbitan monopalmitate, sorbitan tripalmitate, sorbitan monostearate, sorbitan monoisostearate, sorbitan tripalmitate, sorbitan monostearate, sorbitan monoisostearate, sorbital tristearate, sorbitan monooleate, and sorbitan trioleate. The polyoxyethylene chains may contain between about 4 and 30 ethylene oxide units, preferably about 20. The sorbitan ester derivatives contain 1, 2 or 3 polyoxyethylene chains dependent upon whether they are mono-, di- or tri-acid esters.

(e) polyoxyethylene-polyoxypropylene block copolymers having formula $$HO(CH_2CH_2O)_a(CH(CH_3)CH_2O)_b(CH_2CH_2O)_cH \qquad III$$

or $$HO(CH(CH_3)CH_2O)_d(CH_2CH_2O)_e(CHCH_3CH_2O)_fH \qquad IV$$

wherein a, b, c, d, e and f are integers from 1 to 350 reflecting the respective polyethylene oxide and polypropylene oxide blocks of said polymer. The polyoxyethylene component of the block polymer constitutes at least about 10% of the block polymer. The material preferably has a molecular weight of between about 1,000 and 15,000, more preferably from about 1,500 to about 6,000. These materials are well-known in the art. They are available under the trademark "Pluronic" and "Pluronic R", a product of BASF-Wyandotte Corporation.

(f) Alkyl glycosides having formula $$R^4O(R^5O)_n(Z^1)_p \qquad V$$

wherein $R^4$ is a monovalent organic radical (e.g., a monovalent saturated aliphatic, unsaturated aliphatic or aromatic radical such as alkyl, hydroxyalkyl, alkenyl, hydroxyalkenyl, aryl, alkylaryl, hydroxyalkylaryl, arylalkyl, alkenylaryl, arylalkenyl, etc.) containing from about 6 to about 30 (preferably from about 8 to 18 and more preferably from about 9 to about 13) carbon atoms; $R^5$ is a divalent hydrocarbon radical containing from 2 to about 4 carbon atoms such as ethylene, propylene or butylene (most preferably the unit ($R^5O$)n represents repeating units of ethylene oxide, propylene oxide and/or random or block combinations thereof); n is a number having an average value of from 0 to about 12; $Z^1$ represents a moiety derived from a reducing saccharide containing 5 or 6 carbon atoms (most preferably a glucose unit); and p is a number having an average value of from 0.5 to about 10 preferably from about 0.5 to about 5.

Within the compositions of the present claim, alkyl polyglycosides will be present in amounts ranging from about 0.01 to about 20% by weight, preferably from about 0.5 to about 10%, optimally between about 1 and 5%. Examples of commercially available materials from Herkel Kommanditgesellschaft anf Aktien of Dusseldorf, Germany include APG ® 300, 325 and 350 with $R^4$ being $C_9$-$C_{11}$, n is 0 and p is 1.3, 1.6 and 1.8-2.2 respectively; APG ® 500 and 550 with $R^4$ is $C_{12}$-$C_{13}$, n is 0 and p is 1.3 and 1.8-2.2, respectively; and APG ® 600 with $R^4$ being $C_{12}$-$C_{14}$, n is 0 and p is 1.3. Particularly preferred is APG ® 600.

(g) Amine oxides having formula $$R^5R^6R^7N\,O \qquad VI$$

wherein $R^5$, $R^6$ and $R^7$ are saturated aliphatic radicals or substituted saturated aliphatic radicals. Preferable amine oxides are those wherein $R^5$ is an alkyl chain of about 10 to about 20 carbons atoms and $R^6$ and $R^7$ are methyl or ethyl groups or both $R^5$ and $R^6$ are alkyl chains of about 6 to about 14 carbons atoms and $R^7$ is a methyl or ethyl group.

Amphoteric synthetic detergents can be broadly described as derivatives of aliphatic and tertiary amines, in which the aliphatic radical may be straight chain or branched and wherein one of the aliphatic substituents contain from about 8 to about 18 carbons and one contains an anionic water-solubilizing group, i.e., carboxy, sulpho, sulphato, phosphato or phosphono. Examples of compounds falling within this definition are sodium 3-dodecylamino propionate and sodium 2-dodecylamino propane sulfonate.

Zwitterionic synthetic detergents can be broadly described as derivatives of aliphatic quaternary ammonium, phosphonium and sulphonium compounds in which the aliphatic radical may be straight chained or branched, and wherein one of the aliphatic substituents contains from about 8 to about 18 carbon atoms and one contains an anionic water-solubilizing group, e.g. carboxy, sulpho, sulphato, phosphato or phosphono. These compounds are frequently referred to as betaines. Besides alkyl betaines, alkyl amino and alkyl amido betaines are encompassed within this invention.

After the wax capsule has melted, it remains molten or re-solidifies depending on the temperature of the washing medium. Whether in molten or solid state, however, the wax may deposit on the surface of pieces being washed as a soil and impart a spotted, streaked or filmy appearance to those pieces. Wax may also build up on the surfaces in which cleaning is being performed or in cleaning machines.

This soiling by the wax coating may be reduced by incorporating one or more surfactants in the cleaning composition.

Thus, a preferred embodiment of the cleaning composition comprises 0.1-15% by weight wax encapsulated bleach as described above; 1-75% builder; and 0.1-15% surfactant selected from the group consisting of nonionic surfactants, including those of formula

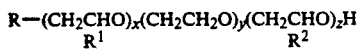

$$R-(CH_2CHO)_x(CH_2CH_2O)_y(CH_2CHO)_zH \quad \quad I$$
$$\phantom{R-(}R^1 \phantom{CH_2O)_x(CH_2CH_2O)_y(}R^2$$

where R is a C6-C10 linear alkyl mixture, $R^1$ and $R^2$ are methyl, x averages 3, y averages 12 and z averages 16, polyoxyethylene or mixed polyoxyethylene/polyoxypropylene condensates of aliphatic alcohols containing 6-18 carbon atoms and 2-30 alkylene oxide.

Silicate

The compositions of this invention may contain sodium or potassium silicate at a level of from about 1 to about 40%, preferably 1-20% by weight of the cleaning composition. This material is employed as a cleaning ingredient, source of alkalinity, metal corrosion inhibitor and protector of glaze on china tableware. Especially effective is sodium silicate having a ratio of $SiO_2$:$Na_2O$ of from about 1.0 to about 3.3, preferably from about 2 to about 3.2. Some of the silicate may be in solid form.

Filler

An inert particulate filler material which is water-soluble may also be present in cleaning compositions in powder form. This material should not precipitate calcium or magnesium ions at the filler use level. Suitable for this purpose are organic or inorganic compounds. Organic fillers include sucrose esters and urea. Representative inorganic fillers include sodium sulfate, sodium chloride and potassium chloride. A preferred filler is sodium sulfate Its concentration may range from 0% to 60%, preferably from about 10% to about 30% by weight of the cleaning composition.

Thickeners and Stabilizers

Thickeners are often desirable for liquid cleaning compositions. Thixotropic thickeners such as smectite clays including montmorillonite (bentonite), hectorite, saponite, and the like may be used to impart viscosity to liquid cleaning compositions. Silica, silica gel, and aluminosilicate may also be used as thickeners. Salts of polyacrylic acid (of molecular weight of from about 300,000 up to 6 million and higher), including polymers which are cross-linked may also be used alone or in combination with other thickeners. Use of clay thickeners for automatic dishwashing compositions is disclosed for example in U.S. Pat. Nos. 4,431,559; 4,511,487; 4,740,327; 4,752,409. Commercially available bentonite clays include Korthix H and VWH ex Combustion Engineering, Inc.; Polargel T ex American Colloid Co.; and Gelwhite clays (particularly Gelwhite GP and H) ex English China Clay Co. Polargel T is preferred as imparting a more intense white appearance to the composition than other clays. The amount of clay thickener employed in the compositions is from 0.1 to about 10%, preferably 0.5 to 5%. Use of salts of polymeric carboxylic acids is disclosed for example in UK Patent Application GB 2,164,350A, U.S. Pat. No. 4,859,358 and U.S. Pat. No. 4,836,948.

For liquid formulations with a "gel" appearance and rheology, particularly if a clear gel is desired, a chlorine stable polymeric thickener is particularly useful. U.S. Pat. No. 4,260,528 discloses natural gums and resins for use in clear autodish detergents, which are not chlorine stable. Acrylic acid polymers that are cross-linked manufactured by, for example, B. F. Goodrich and sold under the trade name "Carbopol" have been found to be effective for production of clear gels, and Carbopol 940 and 617, having a molecular weight of about 4,000,000 is particularly preferred for maintaining high viscosity with excellent chlorine stability over extended periods. Further suitable chlorine-stable polymeric thickeners are described in U.S. Pat. No. 4,867,896 incorporated by reference herein.

The amount of thickener employed in the compositions is from 0 to 5%, preferably 0.5-3%.

Stabilizers and/or co-structurants such as long chain calcium and sodium soaps and $C_{12}$ to $C_{18}$ sulfates are detailed in U.S. Pat. Nos. 3,956,158 and 4,271,030 and the use of other metal salts of long chain soaps is detailed in U.S. Pat. No. 4,752,409. Other co-structurants include Laponite and metal oxides and their salts as described in U.S. Pat. No. 4,933,101, herein incorporated by reference. The amount of stabilizer which may be used in the liquid cleaning compositions is from about 0.01 to about 5% by weight of the composition, preferably 0.01-2%. Such stabilizers are optional in gel formulations. Co-structurants which are found especially suitable for gels include trivalent metal ions at 0.01-4% of the compositions, Laponite and/or water-soluble structuring chelants at 1-60%. These co-structurants are more fully described in the co-pending U.S. patent application Ser. No. 139,492, by Corring et al., filed Dec. 30, 1987, which application is hereby incorporated by reference.

Defoamer

Liquid and "gel" formulations of the cleaning composition comprising surfactant may further include a defoamer. Suitable defoamers include mono- and distearyl acid phosphate, silicone oil and mineral oil. Even if the cleaning composition has only defoaming surfactant, the defoamer assists to minimize foam which food soils can generate. The compositions may include 0.02 to 2% by weight of defoamer, or preferably 0.05-1.0%.

Minor amounts of various other components may be present in the cleaning composition. These include bleach scavengers including but not limited to sodium bisulfite, sodium perborate, reducing sugars, and short chain alcohols; solvents and hydrotropes such as ethanol, isopropanol and xylene sulfonates; flow control agents (in granular forms); enzyme stabilizing agents; soil suspending agents; antiredeposition agents; anti-tarnish agents; anti-corrosion agents; colorants other functional additives; and perfume. The pH of the cleaning composition may be adjusted by addition of strong acid or base. Such alkalinity or buffering agents include sodium carbonate.

The following examples will more fully illustrate the embodiments of the invention. All parts, percentages and proportions referred to herein and in the appended claims are by weight unless otherwise indicated.

EXAMPLE I

Two batches of wax-encapsulated bleach particles were produced with lower melting point waxes in the Glatt WSG-5 fluid bed. Batch A was coated with a mixture of Boler 941 ®/Altafin 125 ® paraffin waxes in a 80/20 ratio. Batch B was coated with 100% Boler 1397 ®. The following conditions were used to coat the Clearon CDB-56 bleach particles.

| Batch A | |
|---|---|
| Fluidized Bed Apparatus | Glatt WSG-5 |
| Spray Mode | Top spray |
| Nozzle | Middle Port w 11" extension |
| Nozzle Tip Diameter | 1.2 mm |
| Volume | 22 liter |
| Bed Weight | 11 lbs. |
| Air Flow Rate | 400-450 cfm |
| Inlet Air Temperature | 27-32° C. |
| Bed Temperature | 28-32° C. |
| Coating Rate | 52 g/min |
| Coating Temperature | 75-80° C. |
| Atomization Air Pressure | 2.5 Bar |
| Atomization Air Temperature | 80-90° C. |
| Batch Time | 148 mins |

Batches made with the top spray method normally lose 15-20% as agglomerated material. The 11 pounds (5 kg) of Clearon CDB-56 ® bleach particles were coated in Batch A with 6 kg of a mixture of 80/20 of Boler 941 ® and Altafin 125 ® paraffin. The resulting encapsulated bleach particles had excellent stability in autodish liquid.

Batch B was coated with 100% Boler 1397 wax applied in a fluidized bed at the following settings:

| Batch B | |
|---|---|
| Spray Mode | Wurster |
| Unit | Glatt GPCG-5 |
| Partition Height | 1.0" |
| Nozzle Tip Diameter | 1.2 mm |
| Volume | 10.5 liter |
| Bed Weight | 17.5 lbs. |
| Air Flow Rate | 200-270 cfm |
| Inlet Air Temperature | 18-24° C. |
| Bed Temperature | 30-31° C. |
| Coating Rate | 72 g/min |
| Coating Temperature | 75-80° C. |
| Atomization Air Pressure | 1.5 Bar |
| Atomization Air Temperature | 80-90° C. |
| Batch Time | 70 mins |

The encapsulated CDB-56 ® of Batch B had excellent stability in autodish liquid at 40° C. and pH of 12.3.

EXAMPLE II

The solubility of coating compositions made from micro-crystalline wax and fatty acid in alkaline media were contrasted with that of coating compositions made from one paraffin wax having a melting point between 40° and 50° C. and a solids content within the scope of the invention. Four different coating compositions were made from a micro-crystalline wax with a pair of fatty acids in the proportions appearing below. Two different paraffin waxes were selected for comparison. The four fatty acid/wax and the two waxes were identified as coating compositions 1 through 6 below.

Equal amounts (0.27 g) of each of coating compositions 1 through 6 were placed in separate beakers, which already contain 2.87 liters of a 0.02% aqueous solution of Emphos CS-1361 ® a surfactant from Witco Corp. of New York, N.Y. The contents of each beaker were heated to 49° C., maintained at this temperature with stirring for 45 minutes, then cooled to room temperature and poured through a USA standard metal sieve with size 50 mesh (300 microns).

Solid wax captured by the sieve was dried and weighed to determine the amount of wax which remained as solid residue after the heating with surfactant.

TABLE II

| | Coating Compositions | | |
|---|---|---|---|
| | Coating Composition | Upper Melting Point (°C.) | % of Initial Wax Present as Residue |
| 1. | 3.6% Multiwax W-145A ® (m.p. = 66-71° C.) 34.4% Capric acid (m.p. = 31.2° C.) 62.0% Lauric acid (m.p. = 54.1° C.) | 35 | 33.6 |
| 2. | 8.8% Multiwax W-145A ® (m.p. = 66-71° C.) 39.8% Capric acid (m.p. = 31.2° C.) 51.4% Lauric acid (m.p. = 54.1° C.) | 28 | 51.7 |
| 3. | 3.6% MultiWax W-145A ® (m.p. = 66-71° C.) 18.3% Capric acid (m.p. = 31.2° C.) 78.1% Myristic acid (m.p. = 54.1° C.) | 51 | 60.4 |
| 4. | 8.8% Multiwax W-145A ® (m.p. = 66.71° C.) 19.0% Capric acid (m.p. = 31.2° C.) 72.2% Myristic acid (m.p. = 54.1° C.) | 48 | 99.2 |

TABLE II-continued

| | Coating Composition | Coating Compositions Upper Melting Point (°C.) | % of Initial Wax Present as Residue |
|---|---|---|---|
| 5. | Boler Paraffin Wax 1397 ® | 46 | 0.04 |
| 6. | Ross fully refined Paraffin Wax 115/120 ® | 46 | 3.4 |

The micro-crystalline wax/fatty acid compositions left large amounts of wax residues. In contrast to coating compositions 1 through 4, the paraffin waxes having melting points from 40°-50° C. and the solids content within the scope of the invention left very little residue, and hence are much preferred as coating for particles.

EXAMPLE III

Bleach was encapsulated as in Example I but with coatings consisting of a wax melting at 72° C. (30% Epolene C-16 ®/70% Boler Paraffin 1426 ®), 52° C. (Altafin 125/130 ®) or 47° C. (Ross 115/120 ®). The capsules coated with the high melting waxes were coated in a fluidized bed as were the capsules of Batch A in Example I, except that for capsules coated with Epolene ®, the bed temperature was 60°-65° C. and for capsules coated with Altafin 125/130 ® the bed temperature was 40°-45° C. The capsules coated with Ross 115/120 ® were prepared as were the capsules of Batch B in Example I. All three capsule batches were coated with a core:coat ratio of 47:53. Thus, in one gram of capsules, there were 0.53 grams of wax.

1.88 grams of each type of capsule were placed in forty grams of an autodish liquid composition composed as follows:

| Material | % Weight |
|---|---|
| 45% KOH | 1.10 |
| Laponite clay | 0.02 |
| TKPP | 4.00 |
| Carbopol 941 ® | 1.00 |
| STP | 1.00 |
| 60% TKPP sol'n | 25.00 |
| D-silicate (44% solution) | 17.00 |
| $K_2CO_3$ (47% sol'n) | 12.77 |
| SLF-18 ® | 1.00 |
| Colorant | 0.5 |
| Perfume | 0.05 |
| Water | 36.56 |

The procedure for making this autodish gel formulation was as follows. Water was loaded into a vessel. The KOH was added with stirring for one minute, followed by the clay with further stirring for another 10 minutes. The blend of TKPP, STP and Carbopol 941 ® was then added over the next 12 minutes, followed by 30 minutes of stirring. The TKPP solution was then added and the mixture was stirred for 30 minutes. Then the D-silicate, $K_2CO_3$ and SLF-18 ® were each added separately, each one being followed by 5 minutes of stirring.

The autodish liquid composition containing the bleach capsules was in turn placed in the dispenser cup of a Kenmore automatic dishwashing machine. One 40 gram sample of autodish liquid was placed in the dispensing cup of the dishwasher at a time and the machine was run through one complete cycle while empty. At the end of the wash cycle, the water draining from the machine was filtered through a U.S. standard metal sieve of 50 mesh into a bucket. The captured wax capsules or particles were dried and weighed. The results appear in the table below and FIG. 1.

| Coat Melting Point (°C.) | % Total Wax Captured |
|---|---|
| 72 | 27.2% |
| 52 | 16.2% |
| 47 | 0 |

EXAMPLE IV

The same three capsule types made in Example III were here tested in preventing spotting on glassware washed in an automatic dishwashing machine. Glass appearance tests were run in Bosch S-512 dishwashers at 140° F. and using water of 120 ppm hardness.

In the test, two washing machines were loaded with ten plates and ten drinking glasses (all of which were clean and spotless). Forty grams of a fatty soil were then smeared on the interior of each washing machine door. The soil was formed by mixing four pounds of Imperial margarine with four packets (12.8 ounces each) of Carnation non-fat dry milk mixed together until smooth. Forty grams of the autodish liquid composition with one of the coated bleach capsules was then loaded into the washing machine cup dispenser. The glassware was then subjected to a short wash cycle. After the wash cycle, each glass was removed from the washer and evaluated for spotting according to the following scale:

Spotting Scale

Figure 2:
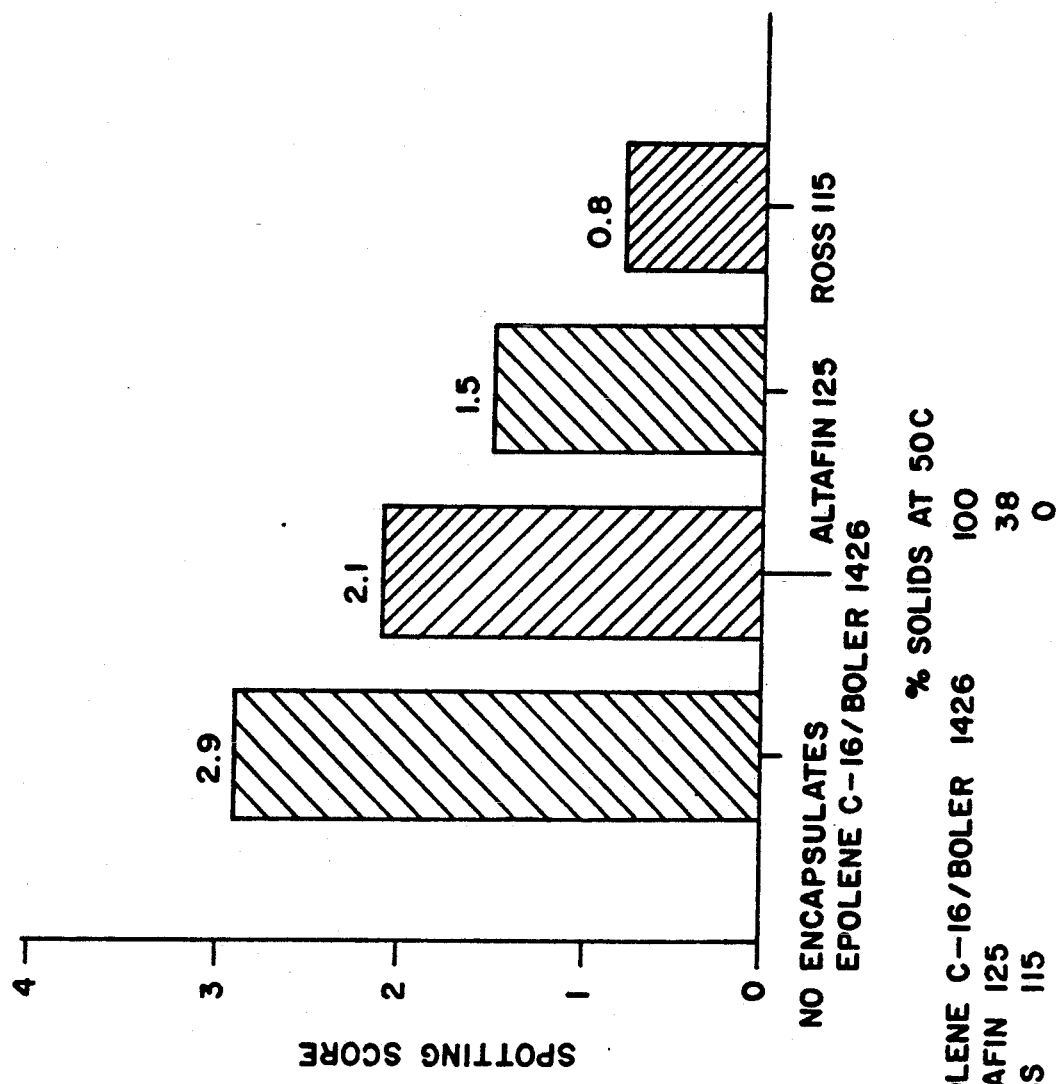
FIG. 2 is a comparative graph of the spotting performance from autodish liquids containing bleach encapsulated with waxes, as described in Example IV which are both within and outside the scope of this invention.

0=spotless
1=few spots
2=⅓ glass spotted
3=⅔ glass spotted
4=glass completely covered with spots The summary of the spotting evaluation appears in FIG. 2. Without bleach, the score was about 2.9, that is, the glasses were heavily spotted. Encapsulated bleach included in the dishwashing composition reduced the number of spots observed on the glassware. A score of 0.8, indicating few spots, was observed when a bleach core encapsulated with a low melting wax within the scope of the invention (i.e., Ross wax 115/120 ®) was used in the test. In contrast, when a bleach encapsulated in a wax coating with a melting point range and solid contents outside the invention's scope (i.e., Altafin 125/130 ® Epolene C-16 ®/Boler 1426 ® mixture) was used in the test formulation, an intermediate number of spots (i.e., 2.1) was observed on the glasses.

EXAMPLE V

To compare the stability in alkaline media of bleach coated with paraffin wax of melting point 40°-50° C. to that of bleach coated with a mixture of microcrystalline wax and fatty acid, Clearon CDB-56 bleach particles ex Olin Corporation having a diameter range of 800 to 2,000 microns were coated with coating composition 3, 4, 5 or 6 described in Example II.

The capsules were made in a Granuglatt apparatus, model number WSG-3 at the following settings:

| Spray Mode | Wurster |
|---|---|
| Initial Bed Charge | 1,600 g |

-continued

| | |
|---|---|
| Inlet Air Temperature | 16–20° C. |
| Bed Temperature | ca. 18–22° C. |
| Coating Rate | 60–80 g/min |
| Coating Temperature | 75–80° C. |
| Atomization Air Pressure | 1.5 Bar |
| Atomization Air Temperature | 79–88° C. |
| Batch Time | 20–28 minutes |

Then 1.8 grams of each capsule were dispersed evenly throughout the automatic dishwashing liquid of Example III. Thus, autodish liquid compositions containing the capsules were formed and each is stored at 40° C. Samples were set up in triplicate in 4 oz. glass jars. Chlorine analysis was carried out after 1, 2, 7, 14, 28, 42, and 56 days.

5 ml aliquots were removed from each of the autodish liquid samples and filtered through USA standard metal sieves, 18 mesh, to remove the capsules. The wax coating was dissolved from each capsule by gentle stirring in hexane for 20 minutes. The amounts of active chlorine remaining was then measured by standard iodometric titration. The results are summarized in the following table.

TABLE III

Storage Stability Results of Capsules Stored in in an Autodish Liquid, pH - 12.3, 40° C.

| Time (days) | Percent Available Chlorine Remaining | | | | |
|---|---|---|---|---|---|
| | Capsule 3 | Capsule 4 | Capsule 4' | Capsule 5 | Capsule 6 |
| 0 | 100.0 | 100.0 | 100.0 | 100.0 | 100.0 |
| 1 | 45.8 | 36.3 | 46.2 | 100.0 | — |
| 2 | 14.2 | 9.6 | 8.9 | 100.0 | — |
| 7 | | | | 100.0 | 100.0 |
| 14 | | | | 98.9 | 100.0 |
| 28 | | | | 98.5 | 83.2 |
| 42 | | | | 97.1 | 82.0 |
| 56 | | | | 96.5 | — |
| 84 | | | | 94.0 | 47.6 |

Capsules 3, and 4 had a melting point of 50° C. and coating levels of 57 and 54 wt. % of the total capsule, respectively. Capsule 4' had the same composition as that of capsule 4 except that its coating level is higher, namely 66%. Capsules 5 and 6 had a coating level of 54%. The results show that fatty acid/micro-crystalline wax coatings protect bleach poorly in an alkaline medium. Thus, these coating materials are not suitable for use in aqueous alkaline media. By contrast, when the coating is a paraffin wax within the scope of the invention, the level of bleach preserved in an alkaline medium is excellent.

EXAMPLE VI

The stability of bleach particles encapsulated with wax coatings of varying thickness was demonstrated by the following experiment. Clearon CDB 56 ® particles sieved to 10 to 20 US mesh size were used as the core material. These bleach particles were coated in a fluidized bed with the equipment and operating conditions specified in EXAMPLE I for Batch B. The coating material was Boler 1397 ® paraffin wax. Batch C was coated with enough Boler 1397 ® so that the paraffin comprises 42% of the encapsulates. Batch D was coated with sufficient Boler 1397 ® so that the paraffin comprises 46% of the encapsulates. Finally, Batch E was coated with sufficient Boler 1397 ® so that the paraffin comprises 50% of the encapsulates.

Samples were set up in 4 oz. glass jars consisting of 1.1 grams of encapsulates dispersed uniformly in 40 grams of the auto dish formulation given in EXAMPLE III. The samples were then stored at 40° C. Chlorine analyses were carried out on triplicate samples from each batch initially and at 4, 8, and 12 week intervals. At these time intervals the samples were filtered and washed on US 18 mesh standard metal screens with cold water so that only capsules and pieces of capsules remained. The chlorine level remaining was then measured by standard iodometric titration. The results for the three batches are summarized in Table IV.

TABLE IV

Effect of Coating Thickness on Chlorine Stability in Auto Dish Liquid Storage at 40° C.

| | Percent Initial Chlorine Stability | | |
|---|---|---|---|
| Time | Batch C 42% Coat | Batch D 46% Coat | Batch E 50% Coat |
| Initial | 100.0 | 100.0 | 100.0 |
| 4 Weeks | 97.7 | 97.7 | 99.6 |
| 8 Weeks | 93.2 | 91.7 | 97.8 |
| 12 Weeks | 80.7 | 85.7 | 97.3 |

Thus, it is shown that coats of greater thickness impart greater protection to bleach particles in aqueous media.

EXAMPLE VII

Figure 3:
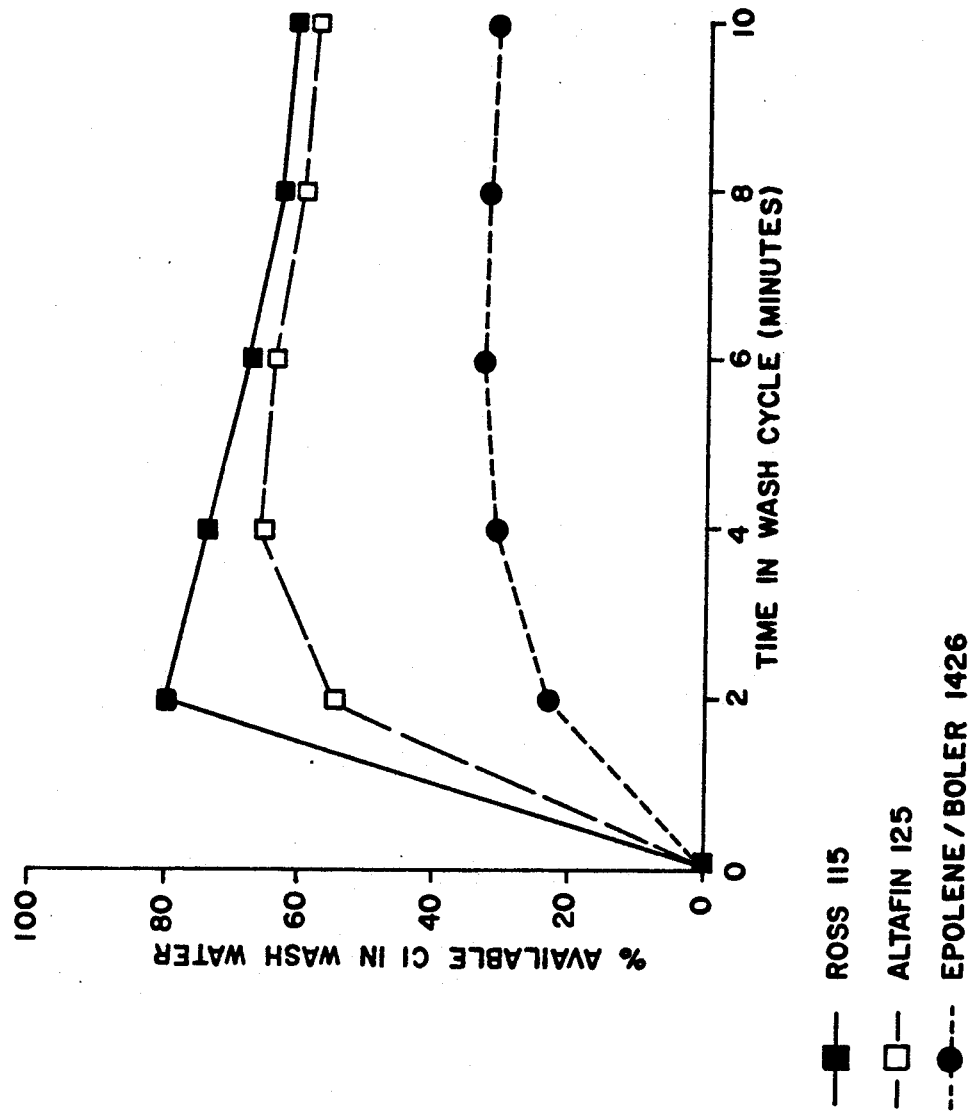
FIG. 3 is a comparative graph of chlorine released by bleach encapsulated with waxes, as described in Example VII, which are both within and outside the scope of this invention.

The capsules of Example III were incorporated into the autodish liquid composition of Example III. Forty grams of each composition were loaded into the dispenser cup of a Kenmore automatic dishwashing machine and the machine was operated through one wash cycle at 46° C. Every two minutes through the wash cycle, a 5 ml aliquot was removed from the wash liquor. The level of available chlorine released from the capsules was measured by standard iodometric titration. As the results show (FIG. 3), the capsules within the scope of this invention release bleach more quickly and more completely. Thus, these capsules demonstrate higher efficiency.

EXAMPLE VIII

Sodium percarbonate particles were provided with a coating of paraffin wax (Boler 1397 ®) having a melting point range of 40°–50° C. The encapsulation was carried out on a Granuglatt Fluid Bed using the Wurster mode, initially containing 1 Kg of the percarbonate particles. The processing conditions were as follows:

Atomization Air Pressure: 1.5 Bar
Atomization Air Temperature: 180°–195° C.
Inlet Air Temperature: 15°–20° C.
Molten Wax Temperature: 80°–85° C.
Product Temperature: 20°–25° C.
Spray Rate: 30–50 gms/minute The Sodium percarbonate had an initial particle size range of 800–1,000 microns and an initial active oxygen level of 13.0%. After the coating was applied, with a thickness of about 250 microns, the following results were found upon titrimetric analysis:

Active Oxygen: 3.53%
Coating Level: 72.8%
Sodium Percarbonate Level: 27.2%

Stability studies were conducted at 40° C. with the capsules suspended in an automatic dishwashing composition having a formulation similar to that of Example III. The testing was carried out in triplicate after 1, 2, 4, 6 and 8 wks. of storage. The results were the following:

1 week: 99.6%
2 weeks: 97.8%
4 weeks: 88.6%
6 weeks: 77.4%
8 weeks: 60.7%

These results show good stability considering the harsh high pH aqueous environment and the irregular shape of the initial percarbonate particles, and the product provides good dishwashing performance.

EXAMPLE IX

Savinase ® 6.0T marumes (ex Novo Industries A/S) particle size 550–650 μm are coated with a 50 weight percent coating of paraffin wax (Boler 1397 ®) having a melting point range of 42°–46° C. with the Wurster process as described in Example 1.

These coated particles are incorporated into a liquid automatic dishwashing formulation as described in Example XIII, but also containing a peroxygen bleach source.

EXAMPLE X

Sodium p-benzyloxybenzene sulfonate is granulated with binder (10% of total granulate) to give a particle of 500 μm to 2000 μm in diameter. This granulate is coated (Boler 1397 ®) in a Granuglatt apparatus with a 50 weight percent coating of paraffin wax model number WSG-3 as described in Example I. These encapsulated particles are included in a liquid automatic dishwashing formula at a level of 2–8% as described in Example XIII but also contains a hydrogen peroxide source.

EXAMPLE XI

A spray dried carrier including sodium carbonate, sodium bicarbonate, and vinyl methyl ether/maleic anhydride copolymer in a ratio of 1:1 is prepared according to the method of Dittmer, et al., G. B. 1,595,769 herein incorporated by reference. The alkoxylated surfactant Poly-Tergent SLF-18 (R) is absorbed onto the spray dried carrier at a level of about 25–30% by weight. This powder is then agglomerated with a binder such as tallow alcohol condensed with 18 ethylene oxide, using a technique similar to that of Leigh, et al. (U.S. Pat. No. 4,111,826), and sieved to a particle size range of about 500 to about 1,500 microns. The resulting granules are then coated to a level of about 50% by weight with Boler 1397 paraffin wax using the Wurster method for Batch B of Example 1. The coated particles are incorporated into a liquid automatic dishwashing product containing free sodium hypochlorite, at a level equivalent to 1–2% of surfactant in the product formulation.

EXAMPLE XII

Mechanically strong, spherical granules containing cholyl 4-sulfophenyl carbonate (CSPC) were produced in a Littleford Lodige granulator. A combination of 19.1 kg CSPC powder and 1.9 kg of succinic acid crystals were charged to the granulator. The dry materials were mixed for 7 minutes by the plough shares operating at 160 rpm. The chopper blades were then started and 6.3 kg of molten (60°–70° C.) Plurafac A-38 was sprayed onto the batch at a rate of 1.00 kg/min. The atomization air pressure utilized was 5.25 bar. The material was simultaneously cooled by running cool water through the mixer jacket. The mixer was run for an additional 5–7 minutes after addition of the agglomerating agent was complete to obtain the proper size granules. Granules were then cooled to <40° C. and screened to obtain a yield of 76.7% granules in the range 700–2000 μm. Oversized material is milled and recycles with the undersized material for future granulation.

The resulting granules are coated with a 50 weight percent coating of Boler 1397 wax with the Wurster process as described in Example 1. These capsules are included into a liquid automatic dishwashing detergent at a level of 2–8% which also contains a hydrogen peroxide source and surfactants, fragrances, and thickeners.

EXAMPLE XIII

Sodium perborate and sodium p-benzoyloxybenzene sulfonate particles are encapsulated in a paraffin wax coating (e.g. Boler 1397) as described in Examples VIII and X above.

3.0 grams of the wax encapsulated sodium perborate particles and 6.0 grams of the wax encapsulated sodium p-benzoylbenzene sulfonate particles were placed in 40 grams of an autodish liquid composition of the following formulation:

| Material | % Weight |
|---|---|
| Sodium Citrate | 15.0 |
| Sodium Acrylate/Maleate copolymer (N.W. 50,000) | 3.0 |
| Polytergent SLF-18 ® | 2.0 |
| Savinase ® | 1.0 |
| Termamyl ® | 1.0 |
| Glycerol | 5.0 |
| Borax | 3.5 |
| Carbopol 940 | 1.0 |

The procedure for making this autodish formulation is as described in Example III above.

EXAMPLE XIV

Clearon CDB-56 bleach particles were wax encapsulated in Boler 1397 paraffin wax as described in Example I for Batch B.

2.70 grams of the wax encapsulated bleach particles were incorporated in 40 grams of an autodish liquid composition of the following formulation:

| Material | % Weight |
|---|---|
| Carbopol 940 | 0.80 |
| Laponite XL5 | 0.01 |
| D-Silicate | 10.00 |
| Polytergent SLF-18 ® | 2.00 |
| STPP | 17.00 |
| NaOH | 0.70 |
| Water q.s. | 100 |

The procedure for making this autodish formulation is as described in Example III above.

EXAMPLE XV

CDB Clearon ® particles were encapsulated with Boler 1397 paraffin by the Wurster method as described in Example I. Batch F was encapsulated with Boler 1397 paraffin wax alone while Batches G–J were encapsulated with a blend of 99% Boler 1397 ® and up to 1% of a wax additive as indicated in Table V below. The thermal properties of the two coatings as determined by DSC scans are listed in Table V.

TABLE V

Thermal Properties of Pure Paraffin and Paraffin with Wax Additives
Results of DSC Scan

| | Wax Additive | Level Wt. % | Upper MP(°C.) | Wt. % 40° C. | Solids 50° C. |
|---|---|---|---|---|---|
| Batch F | None | 0 | 45 | 73 | 0 |
| Batch G | Hercolyn D | 1 | 46 | 72 | 0 |
| Batch H | PC 1344 | 0.5 | 46 | 72 | 0 |
| Batch I | Paraflint H1 | 0.5 | 46 | 72 | 0 |
| Batch J | Epolene C-16 | 0.5 | 46 | 73 | 0 |

All materials added to Boler 1397 Paraffin.
50% coating level.

All coatings were applied at a 50 Wt. % level. Samples were subjected to a freeze/thaw cycle which consists of gradually lowering the temperature from 21° C. to −18° C. and then increasing it back to 21° C. over a 48 hour period. The samples were removed from the cycle at Time Zero and then placed at 40° C. for the remainder of the storage test. Encapsulates are dispersed in auto dish liquid to form samples as described in Example VI. An additional set of samples from each batch is stored from the start at 40° C. to test the stability of the encapsulates which were not subjected to the freeze/thaw cycle. The results for the two batches are summarized in Table VI.

TABLE VI

Stability of Encapsulates with Wax Additives to 40° C. and Freeze/Thaw Conditions Percent Initial Chlorine Stability Batch

| | F | G | H | I | J |
|---|---|---|---|---|---|
| Freeze/Thaw Condition | | | | | |
| Initial | 100 | 100 | 100 | 100 | 100 |
| Time Zero | 36 | 100 | 99 | 89 | 75 |
| 4 Weeks | 37 | 99 | 98 | 93 | 59 |
| 8 Weeks | 22 | 97 | 95 | 82 | 46 |
| 12 Weeks | 0 | 93 | 88 | 77 | 23 |
| 40° C. Storage Condition | | | | | |
| Initial | 100 | 100 | 100 | 100 | 100 |
| 4 Weeks | 100 | 98 | 97 | 97 | 89 |
| 8 Weeks | 96 | 98 | 94 | 91 | 87 |
| 12 Weeks | 95 | 95 | 88 | 94 | 69 |

Thus, it is shown that a minor amount of a wax additive to the paraffin coat may increase the encapsulate stability when stored under cycled freeze/thaw conditions while not significantly changing the coatings thermal characteristics.

EXAMPLE XVI

Reduction of Compressibility with Powder Flow Aids

Batches of Clearon CDB-56 bleach particles were coated with Boler 1538 wax (MP=47° C.) at a fifty percent level as discussed in Example 1. The wax additive Hercolyn D was added to the wax coating material at a one percent level as described in Example XV.

Various coating materials were then added to the batches as follows:

| Batch # | Material | Flow Aid | % Top Coating Material By Weight |
|---|---|---|---|
| 235 | None | None | — |
| 241 | Calcium Silicate | Hubersorb 600 | 0.75% |
| 342 | Calcium Silicate | Hubersorb 600 | 1.00% |
| 343 | Silicon Dioxide | Sipernat 22S | 1.00% |
| 344 | Silicon Dioxide | Sipernat 22S | 2.00% |
| 345 | Silicon Dioxide | Zeothix 265 | 1.00% |
| 346 | Silicon Dioxide | Aerosil R202 | 1.00% |

The selected material were added to the wax particles by blending in a standard V-blender. The wax particles were added to the V-blender (supplied by Paterson Kelly) followed by the addition of the selected powder. The material was then blended for approximately 15 minutes in order to assure that the material contacted all of the wax particles. The material selected sticks to the waxy particle surface providing a uniform, shell-like coating. The consequences of an incomplete coating are that the shell formed is incomplete, and a portion of the wax surface is left exposed. This incomplete shell in susceptible to buckling under a load allowing deformation and leads to compression of the wax coating surface. When the exposed surfaces of the two encapsulates meet under compression they become agglomerated and are not usable.

In order to test the strength of the particles an instrument called a dilatomer was used. The dilatometer is designed to measure compression of a material under a constant load as the temperature conditions the material is subjected to change. The dilatometer has a glass sample vial into which the product to be tested was poured. The material was then covered with a floating piston and the height of the piston was noted. A glass rod placed on the piston was used to provide the desired load on the sample vial. This load can be chosen to simulate the load in a bulk shipping drummor storage hopper. Once the load was applied, the sample was allowed to equilibrate at low temperature so that any compression due to particle settling takes place before any temperature change begins. The sample vial was then placed in a furnace, where the temperature was increased from 22° C. at a set rate (i.e., 0.3° C./minute). When the material reached the temperature at which it began to compress, the piston moved downward, and the change in height of the piston was recorded. By observing where the onset of the change in height occurred the temperature at which the material began to compress was determined.

It has been found that the encapsulates with a uniform secondary coating will not begin to compress until higher temperatures than those with the wax coating alone. The following is a table containing the samples described above and the temperatures at which they began to compress in the standard dilatometer test:

| Batch | Flow Aid and Level | Comp. Temp. | Comments |
|---|---|---|---|
| 235 | None | 24° C. | Slight compression occurs <24° C. but major compression begins at 24° C. |
| 341 | 0.75% Hubersorb 600 | 28° C. | Compression begins at 28° C. |
| 342 | 1.0% Hubersorb 600 | 26° C. | Compression begins at 26° C. |
| 343 | 1.0% Sipernat 22S | 24° C. | No improvement over Batch 235 |
| 344 | 2.0% Sipernat 22S | 25° C. | No improvement over Batch 235 or Batch 343 |

-continued

| Batch | Flow Aid and Level | Comp. Temp. | Comments |
|---|---|---|---|
| 345 | 1.0% Zeothix 265 | 27° C. | Compression begins at 27° C. |
| 346 | 1.0% Aerosil R202 | 24° C. | No improvement over 235 |

Microphotographs of coated particles of batches 341, 342 and 345 showed a substantially uniform coating. It was additionally observed that materials with an average particle size of less than about 5 microns produced a substantially uniform coating on the wax surfaces.

EXAMPLE XVII

Reduction in Compressibility with Polymer Overcoat

Batches of Clearon CDB-56 bleach particles were coated with Boler 1397 wax (MP=42° C.) at a fifty percent level and a wax additive Hercolyn D at a one percent level as described in Examples I and XV.

A selected polymer solution was then sprayed onto the wax surface as a secondary coating. The polymer solution was sprayed onto the encapsulates in the Wurster bottom spray system. The droplets of the polymer solution spread on the wax surface. However, unlike the hot melt spray described in Example I, the droplets of spray did not cool and harden. Instead, the droplets went through a hot temperature section of the bed in which the droplet water evaporated, and a hard polymer film was cast on the capsule surface.

The polymer coatings have no effect on the performance of the capsules because they dissolve in water. When the capsules are blended into the final liquid formulation, the polymer film will dissolve in the water present in the liquid leaving only the original wax encapsulate.

The following batches were used to test the effect of the polymer film overcoat on the compressibility of the wax encapsulates:

| Batch # | Coating and Level | Comp. Temp. | Comments |
|---|---|---|---|
| 5300 | None | 20° C. | Compression begins at 20° C. |
| 5301 | 2.0% Methocel E5 | 29° C. | Slight compression 27-29° C., but major compression begins >29° C. |
| 5302 | 2.0% Opadry | 29° C. | Compression begins at 29° C. |

The dilatomer (See Example XVI) was used to test the strength of the particles. As mentioned earlier this device measures the compression of material with increasing temperature. By looking at the data tabulated above, a temperature point at which massive compression of capsules begins can be determined. Once this compression occurs, the capsules deform and agglomerate which renders them unusable.

It is evident from these results that a secondary polymer coating gives the wax encapsulates greater particle strength at higher temperatures than the wax coating alone. The ability of the coating to prevent agglomeration at higher temperatures is extremely useful for bulk shipping and storage purposes.

EXAMPLE XVIII

Reduction of Compressibility with Secondary Hot Melt Coating

Batches of CDB Clearon bleach particles were coated with Boler 1538 wax (MP=47° C.) at a fifty percent level and with the wax additive Hercolyn D at a one percent level as described in Examples I and XV.

To prevent agglomeration, a hard shell-like capsule surface is desired. One way to create this shell is to add a secondary coating to the capsules which melted at a higher temperature than the primary wax coating but then dissolves in aqueous formulas. The ideal coating would withstand higher temperatures than the wax coating alone in bulk shipping and storage situations, and not effect the performance of the capsules once blended with the liquid. An example of a coating with these properties is Carbowax 4600 (Union Carbide) which is a polyethylene glycol with a molecular weight of 4400–4800, and a melting range of 57°–61° C.

Carbowax coatings were applied to the wax encapsulates in the same Wurster hot melt coating method described in Example I (at levels of 5 & 10% by wt.). The Carbowax formed a complete shell over the capsule, creating a barrier that melted at a higher temperature than the wax. This barrier prevented compression of product at temperatures which the wax coating alone would begin to soften. In order to test the strength of these particles at higher temperatures the dilatometer was used (see Example XVI). The following is a table containing the samples described above, and the temperatures at which they began to compress in the standard dilatometer test:

| Batch | Secondary Coating and Level | Comp. Temp. | Comments |
|---|---|---|---|
| 235 | None | 24° C. | Slight compression <24° C., major compression >24° C. |
| 2105 | 5.0% Carbowax 4600 | 27° C. | Compression begins at 27° C. |
| 2100 | 10.0% Carbowax 4600 | 30° C. | Compression begins at 30° C. |

It is evident from these results that a secondary coating of Carbowax increased wax encapsulate strength at elevated temperatures. A ten percent coating provides a greater barrier, and therefore greater insulation to the higher temperatures making it more effective than the five percent coating. Both of these secondary coatings provide measurable improvement over the wax encapsulate alone, thereby facilitating bulk storage and shipping at elevated temperatures.

The foregoing description and Examples illustrate selected embodiments of the present invention. In light thereof, various modifications will be suggested to one skilled in the art, all of which are within the spirit and purview of this invention.

We claim:

1. A wax encapsulated core material particle for use in liquid cleaning compositions, the encapsulated particle comprising:
   (a) 10-80% by weight of a core particle or an aggregate of core particles which are nonfriable, water soluble or water dispersible or which dissolve, disperse or melt in a temperature range of from about 40° C. to about 50° C., and (b) 20-90% by weight of a continuous coherent waxy coating, the coating consisting essentially of one or more paraffin waxes having a melting point of from about 40° C. to about 50° C. a solids content of from about 35 to 100% at 40° C. and a solids content of from 0 to about 15% at 50° C. and being from 100 to 1,500 microns thick, 0.5 to 1.0 wt. % of a wax additive and 0 to 2 wt. % of a flow aid, the waxy coating being stable in an alkaline environment.

2. The encapsulated particle according to claim 1 wherein the core material is selected from the group consisting of an oxidative bleach, bleach catalyst, an enzyme, a percompound activator and a surfactant.

3. The encapsulated particle according to claim 2 wherein the core material is an oxidative bleach.

4. The encapsulated particle according to claim 3 wherein the oxidative bleach is a hypochlorite.

5. The encapsulated particle according to claim 3 wherein the oxidative bleach is a peroxygen compound.

6. The encapsulated particle according to claim 5 wherein the peroxygen compound is a hydrogen peroxide generating compound.

7. The encapsulated particle according to claim 1 wherein the core material is a cleaning enzyme selected from the group consisting of a protease, a lipase, an amylase and an oxidase.

8. The encapsulated particle according to claim 1 wherein the core material is a bleach catalyst.

9. The encapsulated particle according to claim 1 wherein the core material is a percompound activator.

10. The encapsulated particle according to claim 1 wherein the wax additive is a hydrogenated methyl ester of rosin.

11. The encapsulated particle according to claim 1 wherein the flow aid is selected from the group consisting of calcium silicate, silicon dioxide, sodium silicate, aluminum silicate, sodium aluminum silicate, cellulose polymer, polyethylene glycol and mixtures thereof.

12. The encapsulated particles according to claim 11 wherein the coating is calcium silicate and silicon dioxide.

13. A liquid cleaning composition comprising:
(a) 0.01 to 20% by weight of the composition of an encapsulated core material in the form of particles having
  (i) 10-80% by weight of a core particle or an aggregate of core particles which are nonfriable, water soluble or water dispersible or which dissolve, disperse or melt in a temperature range of from about 40° C. to about 50° C., and
  (ii) 20-90% by weight of a continuous coherent waxy coating, the coating consisting essentially of one or more paraffin waxes having a melting point of from about 40° C. to about 50° C., a solids content of from about 35 to 100% at 40° C. and a solids content of from 0 to about 15% at 50° C. and being from 100 to 1,500 microns thick, 0.5 to 1.0 wt. % of a wax additive and 0 to 2 wt. % of a flow aid, the waxy coating being stable in an alkaline environment;
(b) 0.1 to 30% by weight of an alkalinity agent; and
(c) the balance being water.

14. The composition according to claim 13 wherein the core material is selected from the group consisting of a bleach, an oxidative bleach catalyst, an enzyme percompound activator and a surfactant.

15. The composition according to claim 14 wherein the core material is an oxidative bleach.

16. The composition according to claim 15 wherein the bleach is a hypochlorite generating agent.

17. The composition according to claim 15 wherein the bleach is a peroxygen compound.

18. The composition according to claim 17 wherein the peroxygen compound is a hydrogen peroxide generating compound.

19. The composition according to claim 18 wherein the peroxygen compound is selected from the group consisting of a sodium percarbonate, a sodium perborate and a peracid.

20. The composition according to claim 19 wherein the peroxy acid is selected from the group consisting of magnesium monoperphthalate, 6-(N-phthalimido) peroxyhexanoic acid, 1,12-diperoxydodecanedioic acid and a salt of monopersulfate.

21. The composition according to claim 18 wherein the hydrogen peroxide generating compound is a first core material and the percompound activator is the second core material used to form two types of encapsulated core particles for use in the cleaning composition.

22. The composition according to claim 18 wherein a first core material is the hydrogen peroxide generating compound and a second core material is the bleach catalyst.

23. The composition according to claim 18 wherein a first core material is the hydrogen peroxide generating compound, a second core material is the percompound activator and third core material is the bleach catalyst.

24. The composition according to claim 14 wherein the surfactant is a nonionic surfactant.

25. The composition according to claim 24 wherein the nonionic surfactant is selected from the group consisting of polyoxyethylene and polyoxypropylene condensates of aliphatic carboxylic acids, and polyoxyethylene and polyoxypropylene condensates of aliphatic alcohols having a formula $$R-(CH_2CHO)_x(CH_2CH_2O)_y(CH_2CHO)_zH \quad\quad I$$
$$\phantom{R-(CH_2CHO)_x}R^1\phantom{(CH_2CH_2O)_y}R^2$$

wherein R is a linear alkyl hydrocarbon having an average of 6 to 18 carbon atoms, $R^1$ and $R^2$ are each linear alkyl hydrocarbons of about 1 to about 4 carbon atoms, x is an integer of from 1 to 6, y is an integer of from 4 to 20 and z is an integer from 4 to 25 and polyoxyethylene - polyoxypropylene block copolymers having the formulae $$HO\,(CH_2CH_2O)_a\,(CH(CH_3)\,CH_2O)_b$$
$$(CH_2CH_2O)_cH$$

or $$HO\,(CH(CH_3)CH_2O)_d\,(CH_2CH_2O)_e$$
$$(CH(CH_3)CH_2O)_f$$

wherein a, b, c, d, e and f are integers of from 1 to 250 and the molecular weight is between 1,000 and 10,000, and mixtures thereof.

26. The composition according to claim 13 wherein the core material is a protease, a lipase, an amylase and an oxidase.

27. The composition according to claim 13 wherein the core material is a bleach catalyst.

28. The composition according to claim 27 wherein the surfactant is an alkyl glycoside compound of formula $$R^4O(R^5O)_n(Z^1)_p \qquad V$$

wherein $R^4$ is a $C_6$–$C_{30}$ linear alkyl mixture, $R^5$ is an alkyl moiety containing from 2 to about 4 carbon atoms, n is a number having an average value of 0 to about 12, $Z^1$ represents a moiety derived from a reducing saccharide containing 5 or 6 carbon atoms, p is number having an average value from 0.5 to about 10.

29. The composition according to claim 13 wherein the core material is a percompound activator.

30. The composition according to claim 13 wherein the alkalinity agent is a member of a group consisting of a silicate, a carbonate and a bicarbonate.

31. A liquid cleaning composition comprising:
(a) 0.01 to 5% by weight of the composition of an encapsulated bleach material having
  (i) 10–80% by weight of a core particle or an aggregate of core particles which are nonfriable, water soluble or water dispersible or which dissolve, disperse or melt in a temperature range of from about 40° C. to about 50° C., and
  (ii) 20–90% by weight of a continuous coherent waxy coating, the coating consisting essentially of one or more paraffin waxes having a melting point of from about 40° C. to about 50° C., a solids content of from about 35 to 100% at 40° C. and a solids content of from 0 to about 15% at 50° C. and being from 100 to 1,500 microns thick, 0.5 to 1.0 wt. % of a wax additive and 0 to 2 wt. % of a flow aid, the waxy coating being stable in an alkaline environment;
(b) 5 to 30% by weight alkalinity agent;
(c) 10 to 30% by weight builder;
(d) 0.1 to 5% by weight thickening agent; and
(e) 1 to 5% by weight nonionic surfactant.

32. The composition according to claim 31 wherein the nonionic surfactant is a compound of formula $$R^3-(CH_2CH_2O)_qH \qquad II$$

wherein $R^3$ is a $C_6$–$C_{24}$ linear alkyl hydro carbon and q is a number from 2 to 50.

33. A liquid cleaning composition comprising:
(a) 3 to 15% by weight of the composition of an encapsulated peroxygen compound core material having
  (i) 10–80% by weight of core particle or an aggregate of core particles which are nonfriable, water soluble or water dispersible or which dissolve, disperse or melt in a temperature range of from about 40° C. to about 50° C., and
  (ii) 20–90% by weight of a continuous coherent waxy coating, the coating consisting essentially of one or more paraffin waxes having a melting point of from about 40° C. to about 50° C., a solids content of from about 35 to 100% at 40° C. and a solids content of from 0 to about 15% at 50° C. and being from 100 to 1,500 microns thick, 0.5 to 1.0 wt. % of a wax additive and 0 to 2 wt. % of a flow aid, the waxy coating being stable in an alkaline environment;
(b) 5 to 30% by weight of an alkalinity agent;
(c) 10 to 30% by weight of an nonphosphorous containing builder;
(d) 0.1 to 5% by weight of a thickening agent;
(e) 0.1 to 3% by weight of an enzyme; and
(f) 1 to 5% by weight of a nonionic surfactant.

* * * * *